(12) United States Patent
Semersky et al.

(10) Patent No.: US 9,980,232 B2
(45) Date of Patent: May 22, 2018

(54) TRAFFIC SHAPING TO MITIGATE BROWNOUT CONDITIONS

(71) Applicant: APPLE INC., Cupertino, CA (US)

(72) Inventors: Matthew L. Semersky, San Jose, CA (US); David A. Hardell, San Jose, CA (US); Cyril de la Cropte de Chanterac, San Francisco, CA (US); Yehonantan Perez, Menlo Park, CA (US)

(73) Assignee: APPLE INC., Cupertino, CA (US)

( * ) Notice: Subject to any disclaimer, the term of this patent is extended or adjusted under 35 U.S.C. 154(b) by 31 days.

(21) Appl. No.: 14/726,503

(22) Filed: May 30, 2015

(65) Prior Publication Data
US 2016/0057707 A1 Feb. 25, 2016

Related U.S. Application Data

(60) Provisional application No. 62/005,934, filed on May 30, 2014, provisional application No. 62/044,836, filed on Sep. 2, 2014.

(51) Int. Cl.
*H04W 52/02* (2009.01)

(52) U.S. Cl.
CPC ... *H04W 52/0277* (2013.01); *H04W 52/0229* (2013.01); *H04W 52/0238* (2013.01); *H04W 52/0274* (2013.01); *Y02B 60/50* (2013.01)

(58) Field of Classification Search
CPC ......... H04W 52/0277; H04W 52/0274; H04W 52/0229; H04W 52/0238
See application file for complete search history.

(56) References Cited

U.S. PATENT DOCUMENTS

| 4,641,064 | A | * | 2/1987 | Testin | H04N 5/63 315/411 |
| 5,164,652 | A | * | 11/1992 | Johnson | H01M 6/5066 320/106 |
| 8,750,928 | B2 | * | 6/2014 | Moran | H04M 1/0256 455/556.1 |
| 8,786,297 | B2 | * | 7/2014 | Turchi | G01R 19/16538 324/252 |
| 8,958,854 | B1 | * | 2/2015 | Morley | H04M 1/72563 370/311 |
| 2007/0064779 | A1 | * | 3/2007 | Kappes | H03K 3/02337 375/219 |
| 2007/0204009 | A1 | * | 8/2007 | Shorty | H04L 29/06027 709/218 |
| 2008/0253351 | A1 | * | 10/2008 | Pernu | H04W 52/367 370/345 |

(Continued)

*Primary Examiner* — Tejis Daya
(74) *Attorney, Agent, or Firm* — Kilpatrick Townsend & Stockton, LLP

(57) ABSTRACT

Circuits, methods, and apparatus that react to brownout or near brownout conditions and mitigate complications that may result. Examples may turn off one or more circuits, such as a Wi-Fi transceiver when a brownout condition is reached or neared. Other examples may provide circuits, methods, and apparatus that proactively avoid brownout conditions. These examples may detect that a brownout condition may occur and take steps, such as Wi-Fi traffic shaping, to avoid them. Still further examples may react to brownout or near brownout conditions one or more times, then preemptively act to avoid further brownout conditions.

23 Claims, 20 Drawing Sheets

(56) References Cited

U.S. PATENT DOCUMENTS

| | | | |
|---|---|---|---|
| 2010/0009643 A1* | 1/2010 | Haartsen | H04W 52/0251 455/127.5 |
| 2010/0273519 A1* | 10/2010 | Yen | H04W 52/0274 455/522 |
| 2012/0021707 A1* | 1/2012 | Forrester | H04W 52/281 455/103 |
| 2012/0021800 A1* | 1/2012 | Wilson | H04W 52/146 455/550.1 |
| 2012/0254633 A1* | 10/2012 | Vilhauer | G06F 1/3212 713/300 |
| 2013/0065525 A1* | 3/2013 | Kiukkonen | H04W 52/36 455/41.2 |
| 2013/0094414 A1* | 4/2013 | Park | H04W 52/0274 370/311 |
| 2013/0237777 A1* | 9/2013 | Patel | A61B 5/0024 600/301 |
| 2015/0237191 A1* | 8/2015 | Moran | H04M 1/0256 455/556.1 |

* cited by examiner

| | |
|---|---|
| PREEMPTIVE | NETWORK MANAGEMENT SOFTWARE – MAY INSTRUCT VARIOUS DEVICES IN NETWORK TO ADJUST POWER AND SHAPE TRAFFIC APPROPRIATELY  150 |
| PREEMPTIVE | PEER-TO-PEER SOFTWARE – RECEIVING CIRCUIT MAY MEASURE RSSI AND SEND BACK TO TRANSMITTER<br>- RECEIVER MAY INSTRUCT TRANSMITTER TO SLOW ITS TRANSMISSION RATE  140 |
| PREEMPTIVE | APPLICATION SOFTWARE – MAY TRACK WHICH APPLICATION NEED WI-FI ACCESS AND HOW MUCH ACCESS IS NEEDED  130 |
| PREEMPTIVE | HARDWARE/SOFTWARE – MAY SHAPE TRAFFIC IN VARIOUS WAYS USING VARIOUS CRITERIA<br>- MAY TRACK HISTORY DATA TO PROVIDE WARNING OF BROWNOUT  120 |
| REACTIVE | HARDWARE – MAY SHUTOFF WI-FI WHEN BROWNOUT OCCURS  110 |

Figure 1

| | | |
|---|---|---|
| PREEMPTIVE | NETWORK MANAGEMENT SOFTWARE – MAY INSTRUCT VARIOUS DEVICES IN NETWORK TO ADJUST POWER AND SHAPE TRAFFIC APPROPRIATELY | 150 |
| PREEMPTIVE | PEER-TO-PEER SOFTWARE – RECEIVING CIRCUIT MAY MEASURE RSSI AND SEND BACK TO TRANSMITTER - RECEIVER MAY INSTRUCT TRANSMITTER TO SLOW ITS TRANSMISSION RATE | 140 |
| PREEMPTIVE | APPLICATION SOFTWARE – MAY TRACK WHICH APPLICATION NEED WI-FI ACCESS AND HOW MUCH ACCESS IS NEEDED | 130 |
| PREEMPTIVE | HARDWARE/SOFTWARE – MAY SHAPE TRAFFIC IN VARIOUS WAYS USING VARIOUS CRITERIA - MAY TRACK HISTORY DATA TO PROVIDE WARNING OF BROWNOUT | 120 |
| REACTIVE | HARDWARE – MAY SHUTOFF WI-FI WHEN BROWNOUT OCCURS | 110 |

Figure 5

| | | |
|---|---|---|
| PREEMPTIVE | NETWORK MANAGEMENT SOFTWARE – MAY INSTRUCT VARIOUS DEVICES IN NETWORK TO ADJUST POWER AND SHAPE TRAFFIC APPROPRIATELY | 150 |
| PREEMPTIVE | PEER-TO-PEER SOFTWARE – RECEIVING CIRCUIT MAY MEASURE RSSI AND SEND BACK TO TRANSMITTER<br>- MAY INSTRUCT TRANSMITTER TO SLOW ITS TRANSMISSION RATE | 140 |
| PREEMPTIVE | APPLICATION SOFTWARE – MAY TRACK WHICH APPLICATION NEED WI-FI ACCESS AND HOW MUCH ACCESS IS NEEDED | 130 |
| PREEMPTIVE | HARDWARE/SOFTWARE – MAY SHAPE TRAFFIC IN VARIOUS WAYS USING VARIOUS CRITERIA<br>- MAY TRACK HISTORY DATA TO PROVIDE WARNING OF BROWNOUT | 120 |
| REACTIVE | HARDWARE – MAY SHUTOFF WI-FI WHEN BROWNOUT OCCURS | 110 |

Figure 9

| | | |
|---|---|---|
| PREEMPTIVE | NETWORK MANAGEMENT SOFTWARE – MAY INSTRUCT VARIOUS DEVICES IN NETWORK TO ADJUST POWER AND SHAPE TRAFFIC APPROPRIATELY | 150 |
| PREEMPTIVE | PEER-TO-PEER SOFTWARE – RECEIVING CIRCUIT MAY MEASURE RSSI AND SEND BACK TO TRANSMITTER<br>- RECEIVER MAY INSTRUCT TRANSMITTER TO SLOW ITS TRANSMISSION RATE | 140 |
| PREEMPTIVE | APPLICATION SOFTWARE – MAY TRACK WHICH APPLICATION NEED WI-FI ACCESS AND HOW MUCH ACCESS IS NEEDED | 130 |
| PREEMPTIVE | HARDWARE/SOFTWARE – MAY SHAPE TRAFFIC IN VARIOUS WAYS USING VARIOUS CRITERIA<br>- MAY TRACK HISTORY DATA TO PROVIDE WARNING OF BROWNOUT | 120 |
| REACTIVE | HARDWARE – MAY SHUTOFF WI-FI WHEN BROWNOUT OCCURS | 110 |

Figure 12

| | | |
|---|---|---|
| PREEMPTIVE | NETWORK MANAGEMENT SOFTWARE – MAY INSTRUCT VARIOUS DEVICES IN NETWORK TO ADJUST POWER AND SHAPE TRAFFIC APPROPRIATELY | 150 |
| PREEMPTIVE | PEER-TO-PEER SOFTWARE – RECEIVING CIRCUIT MAY MEASURE RSSI AND SEND BACK TO TRANSMITTER<br>- RECEIVER MAY INSTRUCT TRANSMITTER TO SLOW ITS TRANSMISSION RATE | 140 |
| PREEMPTIVE | APPLICATION SOFTWARE – MAY TRACK WHICH APPLICATION NEED WI-FI ACCESS AND HOW MUCH ACCESS IS NEEDED | 130 |
| PREEMPTIVE | HARDWARE/SOFTWARE – MAY SHAPE TRAFFIC IN VARIOUS WAYS USING VARIOUS CRITERIA<br>- MAY TRACK HISTORY DATA TO PROVIDE WARNING OF BROWNOUT | 120 |
| REACTIVE | HARDWARE – MAY SHUTOFF WI-FI WHEN BROWNOUT OCCURS | 110 |

Figure 15 ic # TRAFFIC SHAPING TO MITIGATE BROWNOUT CONDITIONS

CROSS-REFERENCES TO RELATED APPLICATIONS

This application claims the benefit of U.S. provisional application Ser. No. 62/005,934, filed on May 30, 2014 and No. 62/044,836, filed Sep. 2, 2014, which are incorporated by reference.

BACKGROUND

Battery powered electronic devices have become ubiquitous. Portable computing devices, tablet computers, laptops, all-in-one computers, wearable computing devices, cell phones, smart phones, media phones, storage devices, portable media players, navigation systems, monitors, power supplies, adapters, remote control devices, chargers, and other devices may be battery powered.

Unfortunately, these batteries may not be ideal. Instead of being an ideal voltage source, they may appear to be a voltage source having series and parallel capacitance, series inductance, and series resistance. These stray components may limit the performance of the batteries and therefore the electronic devices being powered by them.

In various circuits, the series impedance of a battery may cause particular problems. Specifically, a battery may provide a current to one or more circuits in a first electronic device. The battery may also provide current to circuits in one or more other electronic devices connected to the first electronic device. The current for these devices may pass through the series impedance.

The current passing through the series impedance may cause a voltage drop. This voltage drop may lower the effective voltage provided by the battery to the circuits in the first and the other electronic devices.

Various electronic circuits may not operate properly at this reduced voltage. That is, errors in data processing, data transmission, data reception, data display, or other function may be compromised by the reduced voltage. The condition where errors may occur due to a decrease in battery voltage may be referred to as a brownout condition.

It may be desirable to avoid or limit these brownout conditions. To do this, it may be desirable to know when a brownout condition may occur and to be able to reduce its damaging effects.

Thus what is needed are circuits, methods, and apparatus that may detect and mitigate these brownout conditions.

SUMMARY

Accordingly, embodiments of the present invention may provide circuits, methods, and apparatus that react to a brownout or near brownout condition to mitigate complications that may result. Further embodiments of the present invention may provide circuits, methods, and apparatus that preemptively anticipate and avoid brownout conditions. Still further embodiments of the present invention may provide circuits, methods, and apparatus that react to brownout or near brownout conditions one or more times, and then preemptively act to avoid further brownout conditions.

An illustrative embodiment of the present invention may monitor a voltage provided by a battery and may react to the occurrence of a brownout or near brownout to mitigate circuit problems that may be caused by the brownout. The battery may be modeled or treated as a voltage source having a complex source impedance. The battery may provide a net voltage equal to the battery voltage less a supply current times a series or source impedance. The series or source impedance may include the complex source impedance through the battery itself, contact resistance between the battery and the electronic device, and trace resistance of the electrical path from the battery to a measuring circuit. The complex source impedance of the battery may increase as the battery provides current and increase with decreasing battery size. That is, a sustained current flow from the battery may cause the complex source impedance to increase. This increasing complex source impedance may increase the series or source impedance, which may cause the net voltage provided by the battery to drop. In some circumstances, the drop in net voltage provided by the battery may cause a loss of functionality or decrease in reliability of one or more circuits in a device being powered by the battery. This may be referred to as a brownout condition.

In this embodiment, the presence of a brownout or near brownout condition may be determined by comparing the net battery voltage to a reference voltage, where the reference voltage is set to be approximately at or above a voltage where one or more circuits in the electronic device fail to properly operate. That is, in order to detect that an actual brownout is occurring, the reference voltage may be set to a voltage where one or more circuits in the electronic device fail to operate properly. In other embodiments of the present invention, the reference voltage may be set to a higher voltage in order to detect that a brownout condition is near or about to occur. The reference voltage or level may be constant over temperature. In other examples, it may vary over temperature to reflect changes over temperature in a minimum useful voltage for one or more circuits powered by the battery.

This embodiment of the present invention may react to the onset or approach of the brownout condition. Specifically, if the net battery voltage drops below the reference level, one or more circuits may be shut off or otherwise disabled. After the voltage has recovered and is above or higher than the reference voltage, the circuit may be turned back on or otherwise enabled. In various embodiments of the present invention, the shut off or disabled circuit may be turned on after a delay or after it has been determined that the battery has sufficiently recovered. This may help to prevent the battery from immediately returning to a brownout or near brownout condition.

In an illustrative embodiment of the present invention, a Wi-Fi transceiver may draw a relatively high amount of current. When the Wi-Fi transceiver transmits data for a sustained duration, the current through the battery's complex source impedance and other series resistance may cause the net battery voltage to drop below the reference voltage, causing a brownout or near brownout condition. This brownout or near brownout may result in the Wi-Fi transceiver being be shut off or otherwise disabled. The resulting decrease in current may allow the battery voltage to recover. Once the battery voltage has recovered, the Wi-Fi transceiver may be turned back on.

In some situations, it may be desirable to maintain a Wi-Fi link or connection when a brownout is being avoided or recovered from. Accordingly, embodiments of the present invention may have an intermediate state where power is provided to a Wi-Fi receiver so that it may receive data, power is provided to a Wi-Fi transmitter so that it may transmit acknowledgement signals, but the Wi-Fi transmitter is disabled for data transmission. In various embodiments of the present invention, this intermediate state may be entered before, after, or both before and after, the Wi-Fi transceiver is shut off or otherwise disabled.

Again, other illustrative embodiments of the present invention may proactively or preemptively act to prevent brownout conditions from occurring. These embodiments of the present invention may determine whether a brownout may occur. For example, embodiments of the present invention may determine that if a transmitter transmits data for a first duration, then that increased current may cause a drop in voltage sufficient to cause a brownout. These embodiments of the present invention may then preemptively act to avoid the brownout, for example by shaping the traffic to be transmitted. This shaping may result in data being transmitted for less than the first duration, which may allow the brownout condition to be avoided. In other embodiments of the present invention, the shaping may include reducing an output power of the transmitter used to transmit data.

These and other embodiments of the present invention may shape the data traffic transmitted by a transceiver in an attempt to avoid a brownout condition in various ways. This shaping may act to reduce the amount of time that a Wi-Fi transmitter is on, thereby minimizing the voltage droop experienced by the system and avoiding a brownout condition. This may be in contrast to normal Wi-Fi operation, which typically seeks to use any available transmit opportunity to send the maximum amount of data possible in rapid succession. In various embodiments of the present invention, the power used to transmit data may be reduced, though since this may result in a decrease in range, it may be used sparingly.

In various embodiments of the present invention, traffic may be shaped in various ways. In general, shaping may be the alteration or modification of one or more parameters or attributes used in the transmission of a data packet. Often, shaping may result in a reduction in data throughput at a transmitter. For example, transmit traffic may be shaped by limiting a duty cycle of the transmitter. This may limit the duration that a battery needs to provide current to a Wi-Fi transmitter, thereby allowing the battery voltage to recover between transmissions. The amount of aggregation that may be used to combine packets may be limited, again limiting the duration that a transmitter is active. The data that is being transmitted may be transmitted at a higher data rate, which may reduce the length of data packets being transmitted. Longer packets may be fragmented, avoiding the need to transmit long data packets that could lead to brownout conditions.

Embodiments of the present invention may consider various factors in determining whether to reduce transmit power or whether and how to shape the Wi-Fi traffic. For example, the occurrence of data transmission errors may be considered. Where data errors occur, it may be undesirable to reduce power or increase the data rate. Where the bandwidth is limited, it may be undesirable to increase the data rate. Where data is being transmitted over a long range, it may be undesirable to decrease the transmit power.

In various embodiments of the present invention, various parameters of device performance may be tracked. For example, the voltage level history of the battery may be tracked. This may help a host device to anticipate how the battery may react to changes in traffic of a Wi-Fi transmitter. In this and other embodiments of the present invention, the durations of transmissions and any resulting brownouts may be tracked or monitored. From this, a maximum length transmission that may be sent without a brownout may be estimated. In these and other embodiments of the present invention, it may be determined which other circuits are active and being powered by the battery. This information may be used to aid in anticipating whether a brownout condition may occur. It may also be used in determining the extent to which Wi-Fi traffic may need to be shaped to avoid a brownout. Using this tracking and circuit knowledge may enable an embodiment of the present invention to act proactively to avoid brownouts instead of waiting for a brownout or near brownout to occur and then reacting.

Again, illustrative embodiments of the present invention may react to brownout or near brownout conditions one or more times, then preemptively act to avoid brownout conditions. For example, brownout or near brownout conditions may be reacted to a number of times by shutting down a Wi-Fi transmitter or transceiver, as described above. Once that number has been reached, the power reduction and traffic shaping techniques described above may be employed.

Another illustrative embodiment of the present invention may determine how much Wi-Fi traffic may be needed by various software modules or applications operating on the device. This information may be used to shape traffic on the Wi-Fi transceiver to avoid brownouts.

Another illustrative embodiment of the present invention may operate between multiple devices. For example, embodiments of the present invention may provide commands where a receiving device may measure a received signal strength and may send this information back to a transmitting device. The transmitting device may then use this to adjust an output power to an appropriate level and to lower the output power if possible to help avoid brownout conditions. Also, in some circumstances, data packets may be received at a rapid rate and acknowledgements transmitted in response could lead to a brownout. Accordingly, the receiving device may instruct the transmitting device to slow down and take more time between transmitted data packets.

Another illustrative embodiment of the present invention may track the various devices on a network and provide instructions regarding power level and traffic shaping to one or more of these devices. For example, a device may be instructed to provide data to another device in such a way that brownout conditions do not occur.

In various embodiments of the present invention, different layers of circuits and software may be involved in avoiding these brownout conditions. For example, at a lowest level, a hardware solution may detect that a brownout condition has been or is about to be reached and may shut off or otherwise disable the Wi-Fi transceiver. In other embodiments of the present invention, a timer may be used to determine whether a Wi-Fi transmitter has been on for a certain length of time may be used. When the Wi-Fi transmitter is on for a time longer than the certain length, the Wi-Fi transmitter may be shut off or otherwise disabled to avoid a brownout.

In various embodiments of the present invention, a next higher level may include a processor and related software. This level may be responsible for the traffic shaping described above. The traffic shaping may be done by altering one or more transmit parameters based on one or more data inputs, again as described above.

In determining how and when to shape Wi-Fi traffic, this level may track various parameters of device performance. Again, the voltage level history of the battery may be tracked. This may help a host device to anticipate how the battery may react to changes in traffic of a Wi-Fi transmitter. In this and other embodiments of the present invention, the durations of transmissions and any resulting brownouts may be tracked or monitored. From this, a maximum length transmission that may be sent without a brownout may be estimated.

This level may also know which circuits are active and being powered by the battery. This information may be used to aid in anticipating whether a brownout condition may occur. It may also be used in determining the extent to which Wi-Fi traffic may need to be shaped to avoid a brownout. For example, a processor and its software may be aware that a monitor and keyboard may be operational and may draw a first level of current. The processor may determine that the Wi-Fi transceiver may transmit for a first duration before a brownout is reached. This level may then shape Wi-Fi traffic such that the transceiver does not transmit for longer than the first duration.

In various embodiments of the present invention, a next higher level may include application software for the device. This level may determine how much Wi-Fi transmit traffic may be needed by various software modules operating on the device. This information may be used to shape traffic on the Wi-Fi transmitter to avoid brownouts.

In various embodiments of the present invention, a next higher level may include peer-to-peer software. This level may provide commands where a receiving device may measure a received signal strength and may send this information back to a transmitting device. The transmitting device may then use this to adjust an output power to an appropriate level and to lower it if possible to help avoid brownout conditions. Also, in some circumstances, data packets may be received very quickly and the acknowledgements transmitted in response could lead to a brownout. Accordingly, this software layer may also be used by a receiving device to instruct the transmitting device to slow down and take more time between transmitted data packets.

In various embodiments of the present invention, a next higher level may include network management software. This level may track the various devices on a network and provide instructions regarding power level and traffic shaping to one or more devices. For example, a network manager may ensure that data is provided to a device in such a way that brownout conditions do not occur.

Again, various embodiments of the present invention may lower an output power or shape traffic at a Wi-Fi transmitter in order to avoid brownouts. In other embodiments of the present invention, a communication standard may be changed to avoid brownouts. For example in a point-to-point network, a communication channel may change from Wi-Fi to Bluetooth to reduce power consumption and avoid brownout conditions.

Various embodiments of the present invention may implement these techniques in various ways using various algorithms. For example, an embodiment of the present invention may implement various levels of traffic shaping. A traffic manager may change the level of traffic shaping based on the occurrence or non-occurrence of various events. In general, as possible brownout conditions are detected, more stringent levels of traffic shaping may be implemented. For example, when a first possible brownout condition is detected, an attempt to avoid further such conditions may be made by limiting a duty cycle of a Wi-Fi transmitter to a specific percentage. This may provide time for a battery to recover between data transmissions in order to avoid further possible brownout conditions. If possible brownout conditions are detected even with this duty cycle limitation, additional cumulative traffic shaping measures, such as limiting a minimum data rate, may be undertaken. Limiting a minimum data rate may reduce the length of transmitted packets, thereby helping to avoid possible brownout conditions. Additional traffic shaping measures may further be added as necessary if possible brownout conditions continue to be detected. For example, long data packets may be fragmented and aggregation of smaller packets may be limited such that packets are shorter than a specific length or range of lengths. If needed, additional measures, such as further increasing a data rate, further reducing the possible duty cycle of the Wi-Fi transmitter, or reducing transmitter power, may be undertaken. In these and other embodiments of the present invention, less stringent levels of traffic shaping may be used following certain events, such as when a new data transfer is started, after a certain amount of time, after a certain amount of time passes without the detection of a possible brownout condition, or after a sleep state is entered or exited.

In other embodiments of the present invention, a known safe, or presumed safe, level of traffic shaping may be entered when a possible brownout condition is initially detected. This safe level may be a level where further possible brownout conditions are not expected to occur. For example, when a possible brownout condition is detected, traffic shaping to limit packet duration and transmit duty cycle may be implemented. Limiting the duration of transmit packets may prevent a long Wi-Fi transmission from causing a brownout condition. Enforcing a limited duty cycle may provide a battery with the time needed to recover in order to avoid a brownout condition. The limits on duration may be achieved by limiting a minimum data rate, by fragmenting long packets, limiting aggregation of shorter packets, or a combination thereof. These various factors may be arranged to limit a Wi-Fi transmitter such that it does not transmit data longer than a specific time (or range of times) and that the transmitter does not transmit at a higher than a specific duty cycle. If further possible brownouts are detected, higher or more stringent levels of traffic shaping may be employed.

In various embodiments of the present invention, traffic shaping may be stopped at the occurrence of one or more of several events. For example, when the transmission of a group of packets is completed, or a sleep state is entered or exited, traffic shaping may be exited or stopped. In these or other embodiments of the present invention, when a specific duration has passed, or when a specific duration has passed without the detection of a possible brownout state, traffic shaping may be stopped or reduced. In these and other embodiments of the present invention, an application layer may determine that power usage by other applications running on the device may remain high for a period of time. This may indicate that possible brownout conditions may continue and may prevent the level of traffic shaping from being decreased.

Various embodiments of the present invention may employ these and similar techniques where data is being transmitted wirelessly, wired, or some combination thereof. While embodiments of the present invention may be well-suited to use with Wi-Fi transceivers, in other embodiments of the present invention, embodiments of the present invention may be used with other wired or wireless communication techniques or standards, such as cellular communications, near-field communications, and other communications that are currently available, under development, or will be developed in the future.

Various embodiments of the present invention may incorporate one or more of these and the other features described herein. A better understanding of the nature and advantages of the present invention may be gained by reference to the following detailed description and the accompanying drawings.

BRIEF DESCRIPTION OF THE DRAWINGS

FIG. 1 illustrates various levels of hardware and software that may be used in detecting, anticipating, mitigating, or preventing brownout conditions according to embodiments of the present invention;

FIG. 5 highlights a hardware and software level that may be used in anticipating and preventing brownout conditions according to embodiments of the present invention;

FIG. 9 illustrates a software layer that may be used in anticipating and avoiding brownout conditions according to an embodiment of the present invention;

FIG. 12 illustrates a peer-to-peer software level that may be used in anticipating and preventing brownout conditions according to an embodiment of the present invention;

FIG. 15 illustrates a network management software layer that may be used in anticipating and preventing brownout conditions according to an embodiment of the present invention;

DESCRIPTION OF EXEMPLARY EMBODIMENTS

FIG. 1 illustrates various levels of hardware and software that may be used in detecting, anticipating, mitigating, or preventing brownout conditions according to embodiments of the present invention. This figure, as with the other included figures, is shown for illustrative purposes and does not limit either the possible embodiments of the present invention or the claims.

In this figure, a low-level hardware level 110 is highlighted. These hardware solutions are typically reactive in nature. That is, they react to the presence or occurrence of a brownout or near brownout condition and act to mitigate the ramifications of the occurrence. Embodiments of the present invention that may include these hardware solutions are shown in the following figures.

Figure 2:
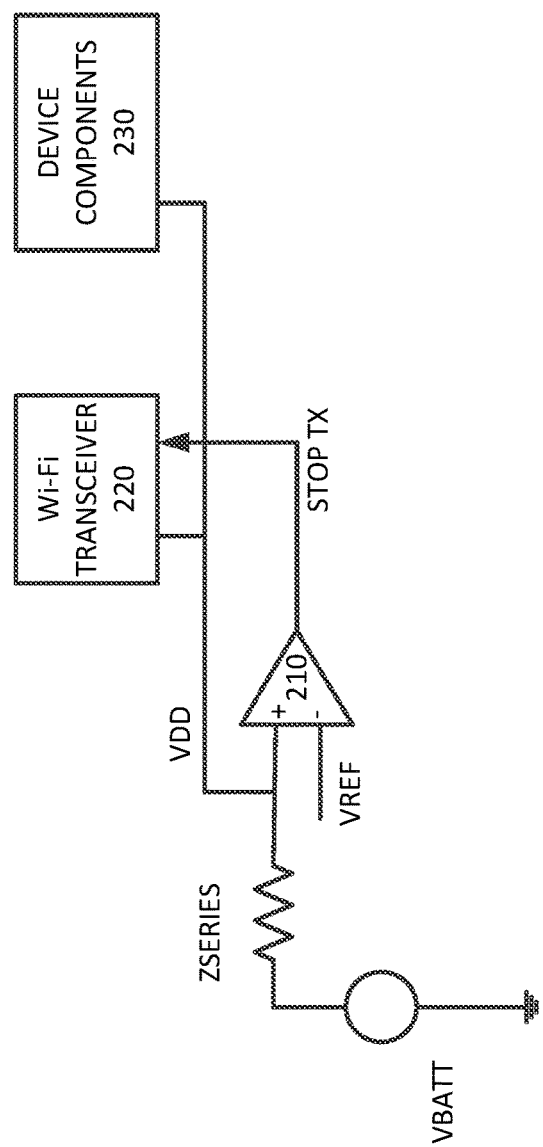
FIG. 2 illustrates a portion of an electronic device according to an embodiment of the present invention.

FIG. 2 illustrates a portion of an electronic device according to an embodiment of the present invention. In this figure, a battery may provide a voltage to circuitry in the electronic device including Wi-Fi transceiver 220 and device components 230. Device components 230 may include other circuitry of the electronic device or other device or devices powered by the battery.

The battery may include a series or source impedance, shown here as resistor ZSERIES. The impedance ZSERIES may include the complex source impedance of the battery itself, the resistance of terminals associated with the battery, and one or more conductors connecting the battery to the remaining electronic device. Current draw by Wi-Fi transceiver 220 and device components 230 may pass through the series impedance ZSERIES, thereby generating a voltage drop. A supply voltage VDD equal to the battery voltage VBATT less the voltage drop across ZSERIES may be provided to the electronic device. Again, an excessive voltage drop across ZSERIES may reduce VDD such that one or more circuits powered by the battery may not operate properly. This state may be referred to as a brownout condition.

Accordingly, embodiments of the present invention may include a hardware solution to detect and react to such a brownout event. In other embodiments of the present invention, the hardware solution may detect and react to a near brownout state. That is, the hardware solution may detect that a brownout is about to occur and react to avoid the brownout. This hardware solution may include comparator 210. Comparator 210 may compare the net battery voltage VDD to a reference voltage VREF in order to detect a brownout condition. VREF may be set to be at least near a minimum operating voltage for one or more circuits powered by the battery in order to detect a brownout. In other embodiments of the present invention, VREF may be set to a higher voltage in order to detect that a brownout may be about to occur.

When a current drawn from the battery is high, for example when the Wi-Fi transceiver 220 transmits data for long periods of time, the impedance ZSERIES may increase in value. The impedance ZSERIES may increase as charge near a battery cell terminal is removed to satisfy the load demand. As charge near the battery cell terminal is removed, further charge may need to diffuse further through the battery electrolyte, resulting in a higher impedance. This may be modeled as a resistance in parallel with a capacitance in the battery.

The resulting increase in impedance ZSERIES may act to decrease the net voltage VDD provided by the battery. When the net battery voltage is less than the reference voltage VREF, a brownout state has occurred or is about to occur, depending on the level of VREF used. In response, comparator 210 may provide a STOP TX signal to the Wi-Fi transceiver 220. Wi-Fi transceiver 220 may stop transmitting in response to receiving the signal. Any packets being transmitted by the Wi-Fi transceiver 220 when it is shut down may be rescheduled for later transmission. Shutting down the Wi-Fi transceiver 220 may reduce a current through ZSERIES allowing the net battery voltage VDD to increase. This increase may prevent or remove the brownout condition and allow other circuits powered by the battery to operate correctly. After a certain amount of time, charge may be redistributed throughout the battery. This redistribution may increase the charge near the battery cell terminal, thereby decreasing the battery series impedance ZSERIES. After that time, comparator 210 may allow Wi-Fi transceiver 220 to turn back on and begin transmitting data.

In various embodiments of the present invention, Wi-Fi transceiver 220 may be turned back on after a delay, or after it has been determined that the battery has sufficiently recovered. In various embodiments of the present invention, a delay may be implemented as a delay circuit. In other embodiments of the present invention, comparator 210 may be a hysteresis comparator. The hysteresis of comparator 210 may ensure that the net battery voltage VDD has recovered and increased in value before Wi-Fi transceiver 220 may be turned back on. When a hysteresis comparator is used for comparator 210, VREF may be adjusted so that a brownout or near brownout condition is detected at the correct voltage level.

Figure 3:
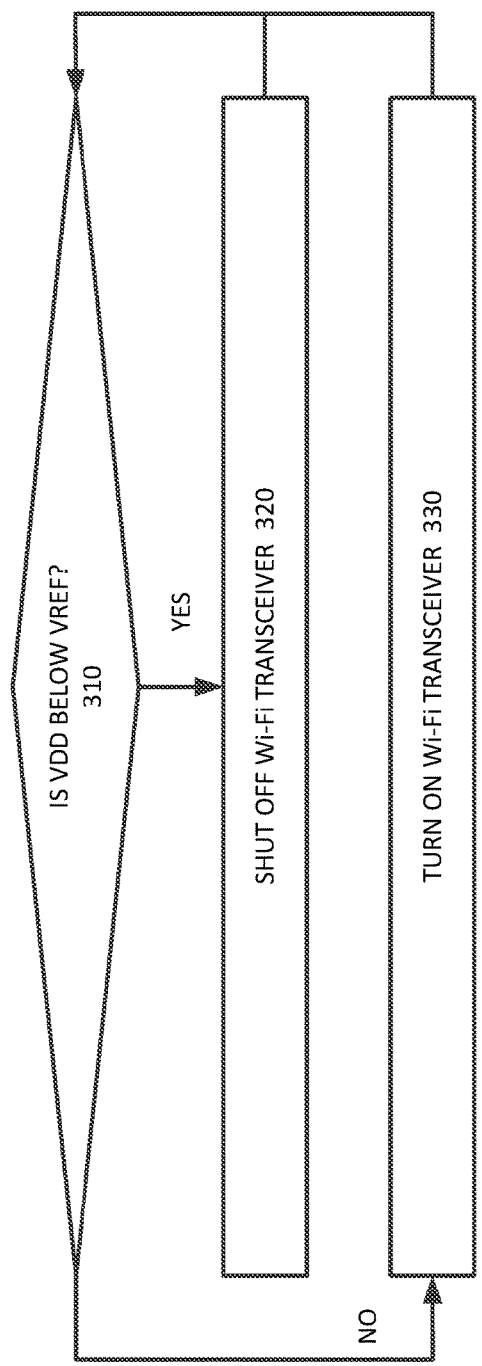
FIG. 3 illustrates a flowchart of a method of reacting to a brownout condition and mitigating its consequences.

FIG. 3 illustrates a flowchart of a method of reacting to a brownout or near brownout condition and mitigating its consequences. In act 310, it is determined whether a net voltage VDD provided by a battery is below a reference VREF. If it is, in act 320, a Wi-Fi transceiver may be shut off. Once VDD is no longer below VREF in act 310, the Wi-Fi transceiver may be turned back on in act 330. Any packets being transmitted by the Wi-Fi transceiver when it is shut off may be rescheduled to be resent. In this example the Wi-Fi transceiver is shut off when a net voltage VDD provided by a battery is below a reference VREF, though in other embodiments of the present invention, the Wi-Fi transmitter may be shut off while the receiver remains enabled.

In other embodiments of the present invention, it may be desirable to maintain a Wi-Fi link even when a Wi-Fi transmitter is prevented from transmitting data in order to avoid a brownout condition. An example is shown in the following figure.

Figure 4:
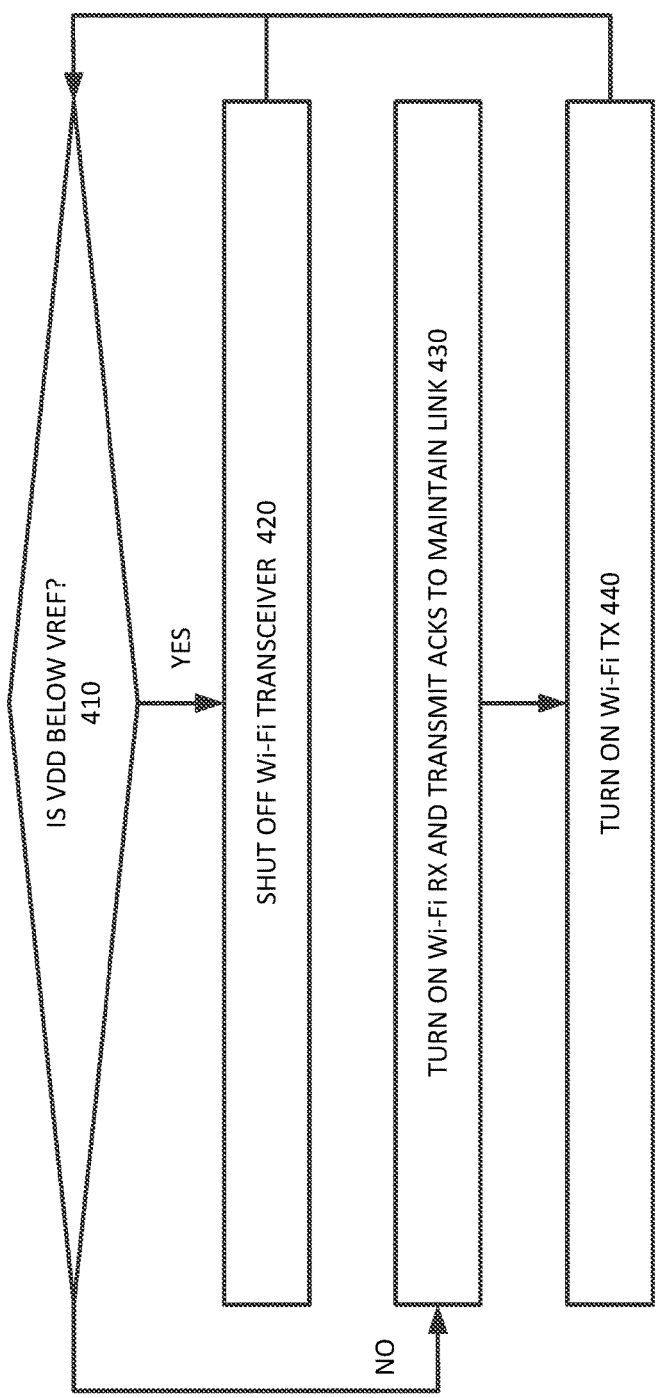
FIG. 4 illustrates another flowchart of a method of reacting to a brownout condition and mitigating its consequences.

FIG. 4 illustrates another flowchart of a method of reacting to a brownout or near brownout condition and mitigating its consequences. In act 410, it is determined whether a net battery voltage is below a reference voltage. If it is, a brownout or near brownout condition may be occurring and Wi-Fi circuitry, such as a Wi-Fi transceiver, may be shut down in act 420. This shutdown may allow the net battery voltage to rise above the reference voltage, whereupon the Wi-Fi receiver may be turned back on. Also, in act 430, the transmitter may be turned on for the limited purpose of sending acknowledgments of data received. After an amount of time has passed, it may be either assumed or determined that the battery has recovered, and the Wi-Fi transmit circuitry may be turned on in act 440 for the purpose of transmitting data. Again, the receiver and transmitter may be turned on after a delay or after it has been determined that the battery has sufficiently recovered.

Again, the circuitry in these examples may typically be reactive. That is, when a brownout or near brownout occurs, circuitry may be turned off such that the brownout condition may be exited or avoided. Once the brownout or near brownout condition ceases, circuitry may be turned back on, again after a delay either in stages or all once.

In other embodiments of the present invention, circuitry and software may act in a preemptive manner to avoid brownout conditions. In these embodiments, the hardware solutions described above may remain in place as a fallback.

FIG. 5 highlights a hardware and software level that may be used in anticipating and preventing brownout conditions according to embodiments of the present invention. This level 120 may be a combined hardware or software level. Hardware and software at this level 120 may shape transmit traffic in various ways using various criteria. This level may also track history data for the battery to provide warning of a brownout. This level may also monitor power supply current usage of circuitry powered by a battery in determining whether a brownout may occur. Examples are shown in the following figures.

Figure 6:
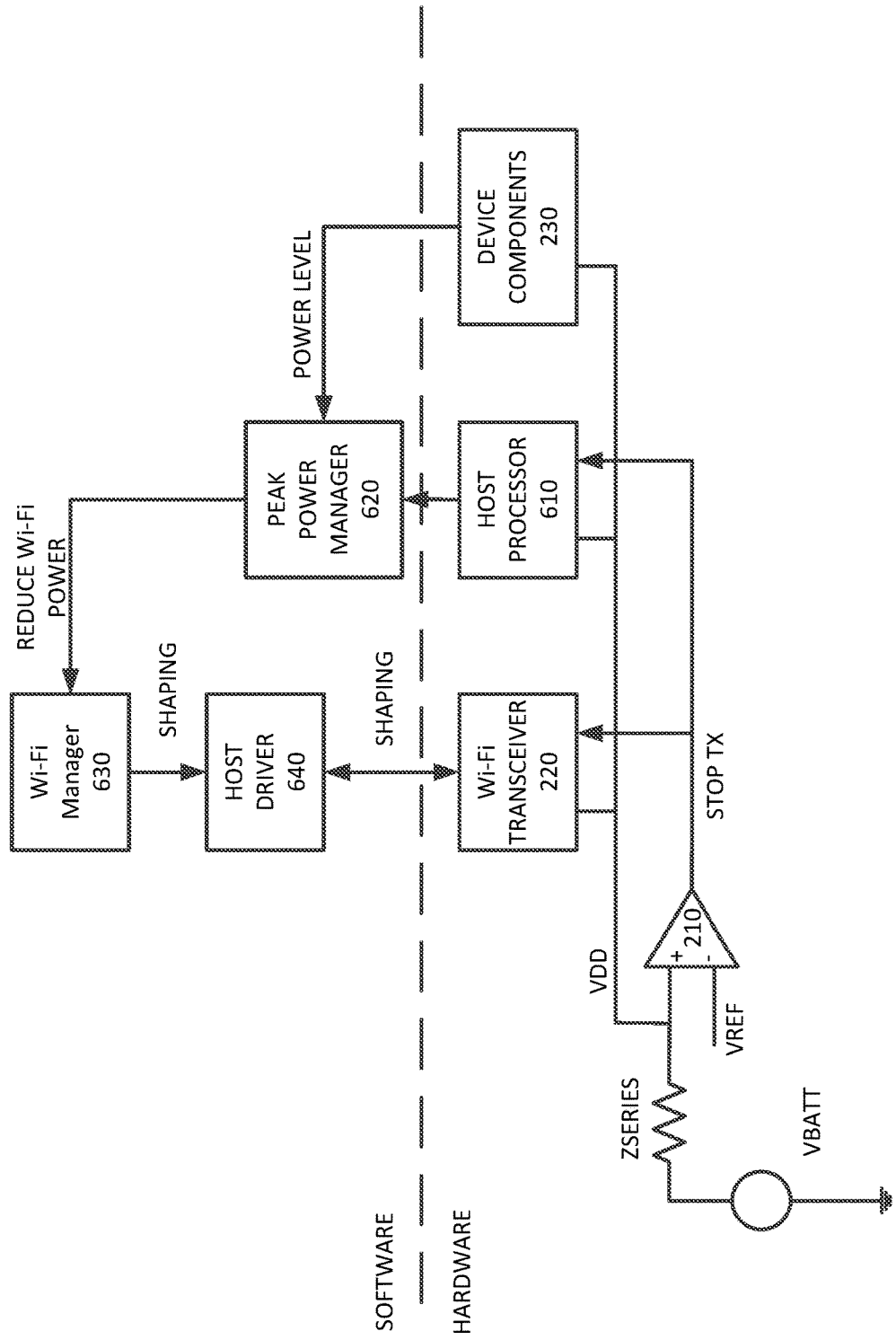
FIG. 6 illustrates hardware and software in an electronic device according to an embodiment of the present invention.

FIG. 6 illustrates hardware and software in an electronic device according to an embodiment of the present invention. In this example, a peak power manager 620 may determine a level of current used by circuits powered by a battery, such as device components 230. Again, device components 230 may include other circuitry of the electronic device or other device or devices powered by the battery. This determination may also include circuits such as host processor 610 and Wi-Fi transceiver 220. These current levels may be used in determining whether a brownout condition may occur if Wi-Fi transceiver 220 transmits data at a first power level for a first duration. That is, the peak power manager 620 may know that if the Wi-Fi transceiver 220 were to transmit power at a first power level, that a first current would be drawn from the battery for the Wi-Fi transceiver 220 and the other circuits powered by the battery. The peak power manager may also know that if this first current is drawn from the battery for a first duration that a brownout condition may occur. If a brownout condition may occur, the power manager 620 may send a reduce Wi-Fi power signal to Wi-Fi manager 630. This signal may instruct the Wi-Fi manager 630 to shape the traffic transmitted by Wi-Fi transceiver 220. This shaping may cause the Wi-Fi transceiver 220 to transmit data at a lower power level than the first power level, the shaping may cause the Wi-Fi transceiver 220 to transmit for a duration that is shorter than the first duration, or the shaping may cause a combination thereof. In many embodiments of the present invention, it may be undesirable to reduce a power transmitted by Wi-Fi transceiver 220. Accordingly, the transmit data may often be shaped such that data is transmitted at the first power level for a duration that is less than the first duration. Wi-Fi manager 630 may communicate with the Wi-Fi transceiver 220 through the host driver 640.

In this example, peak power manager 620 may instruct the Wi-Fi manager 630 to shape traffic transmitted by Wi-Fi transceiver 220 to avoid brownout conditions. In other situations, brownouts may occur and comparator 210 may shut Wi-Fi transceiver 220 down on one or more occasions. Wi-Fi transceiver 220 may then ask the Wi-Fi manager 630 to shape the data to be transmitted in order to avoid further brownout conditions.

Again, this traffic may be shaped in various ways. In general, shaping transmit traffic involves changing one or more attributes or parameters used in data transmission. Often, shaping transmit traffic results in a decreased data throughput for a transmitter. For example, transmit traffic may be shaped by limiting a duty cycle of the transmitter. This may limit the duration that a battery needs to provide current to a Wi-Fi transmitter, thereby allowing the battery to recover. The amount of aggregation that may be used to combine packets may be limited, again limiting the duration that a transmitter is active. The data that is being transmitted may be transmitted at a higher data rate, which may reduce the length of data packets being transmitted. Longer packets may be fragmented into multiple shorter packets. This may help to avoid the transmission of long data packets that could lead to long transmission times, which in turn may lead to brownout conditions. These and other attributes or parameters may be varied in order to shape transmit traffic.

Again, various factors may be considered in determining how to shape this traffic. For example, the occurrence of data transmission errors may be considered. Where data errors occur, it may be undesirable to reduce power or increase the data rate. The available bandwidth of the channel may be considered. Where the bandwidth is limited, it may be undesirable to increase the data rate. Where data is being transmitted over a long range, it may be undesirable to decrease the transmit power.

In various embodiments of the present invention, peak power manager 620, Wi-Fi manager 630, and host driver 640, may be implemented as processing modules or software program code executing on a processor, such as a host processor. In other embodiments of the present invention, they may be implemented as software program code executing on a customized or other circuit, such as an application specific integrated circuit or field programmable gate array, or on a general-purpose programmable processor. In various embodiments of the present invention, these integrated circuits may store and execute the software program code, though in other embodiments, the software program code may be stored in a system memory or other memory.

Again, embodiments of the present invention may monitor a current draw of circuits powered by a battery in determining whether a brownout condition may occur. In other embodiments of the present invention, this determination may be enhanced by the use of a history showing how a battery voltage has reacted when current has been drawn from it. An example is shown in the following figure.

Figure 7:
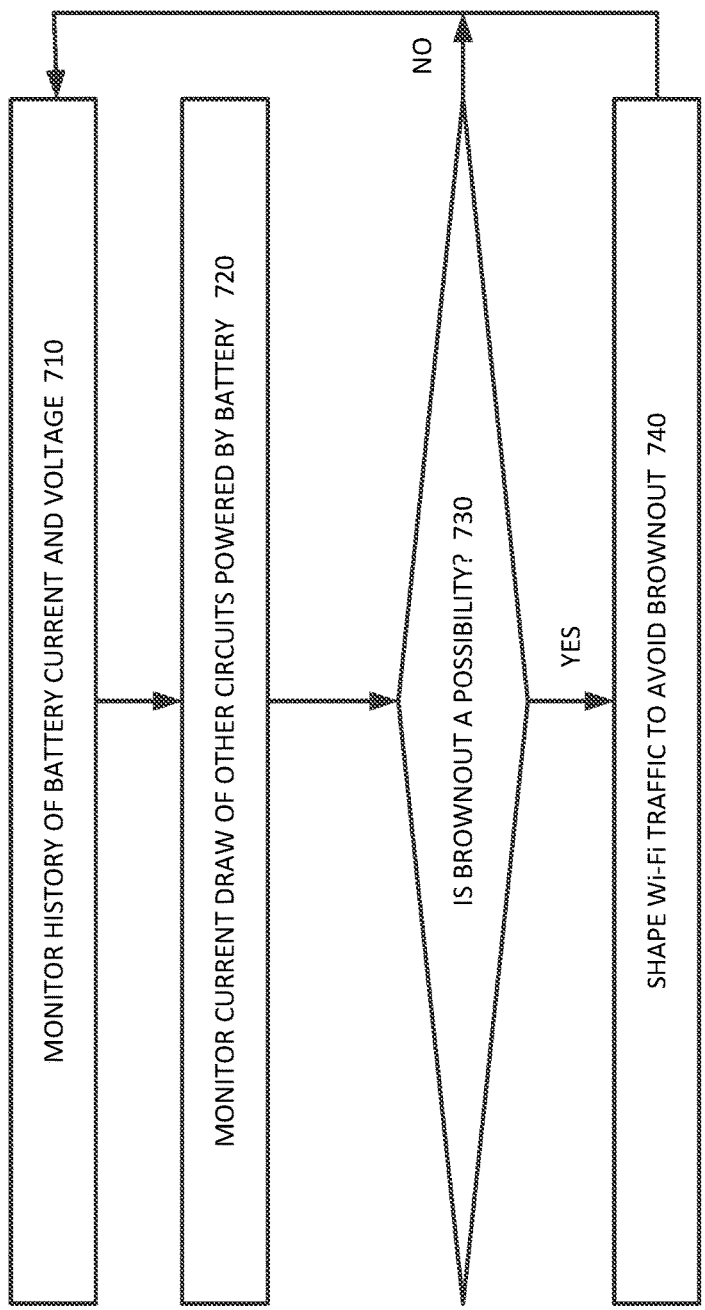
FIG. 7 illustrates a flowchart of a method of anticipating and avoiding brownouts according to an embodiment of the present invention.

FIG. 7 illustrates a flowchart of a method of anticipating and avoiding brownouts according to an embodiment of the present invention. In act 710, a history of battery current levels and resulting voltages may be stored and monitored. A current drawn by circuits powered by the battery may be monitored in act 720. From this, in act 730, it may be determined if a brownout may occur during a data transmission. If so, the traffic may be shaped to avoid a brownout in act 740. For example, it may be determined that if a transmission of a first duration were to occur that a brownout would result. The transmit traffic may be shaped in response such that the transmission is less than the first duration to avoid the brownout.

For example, in act 710 it may be known from the stored battery history data that the battery may reach a brownout voltage if the battery provides a first current for a first duration. It may then be determined in act 720 that a second current is presently being drawn from the battery. From this, it may then be calculated that the transmitter may not draw an amount of current equal to the first current less the second current for the first duration without causing a brownout. The determination of whether this brownout may occur may be determined in act 730. If a brownout may occur, then in act 740, transmit traffic may be shaped to avoid the brownout.

Again, in various embodiments of the present invention, brownout or near brownout conditions may occur, thereby shutting down Wi-Fi transmissions. The Wi-Fi transceiver may then request that a Wi-Fi manager shape transmit traffic to avoid further occurrences. An example is shown in the following figure.

Figure 8:
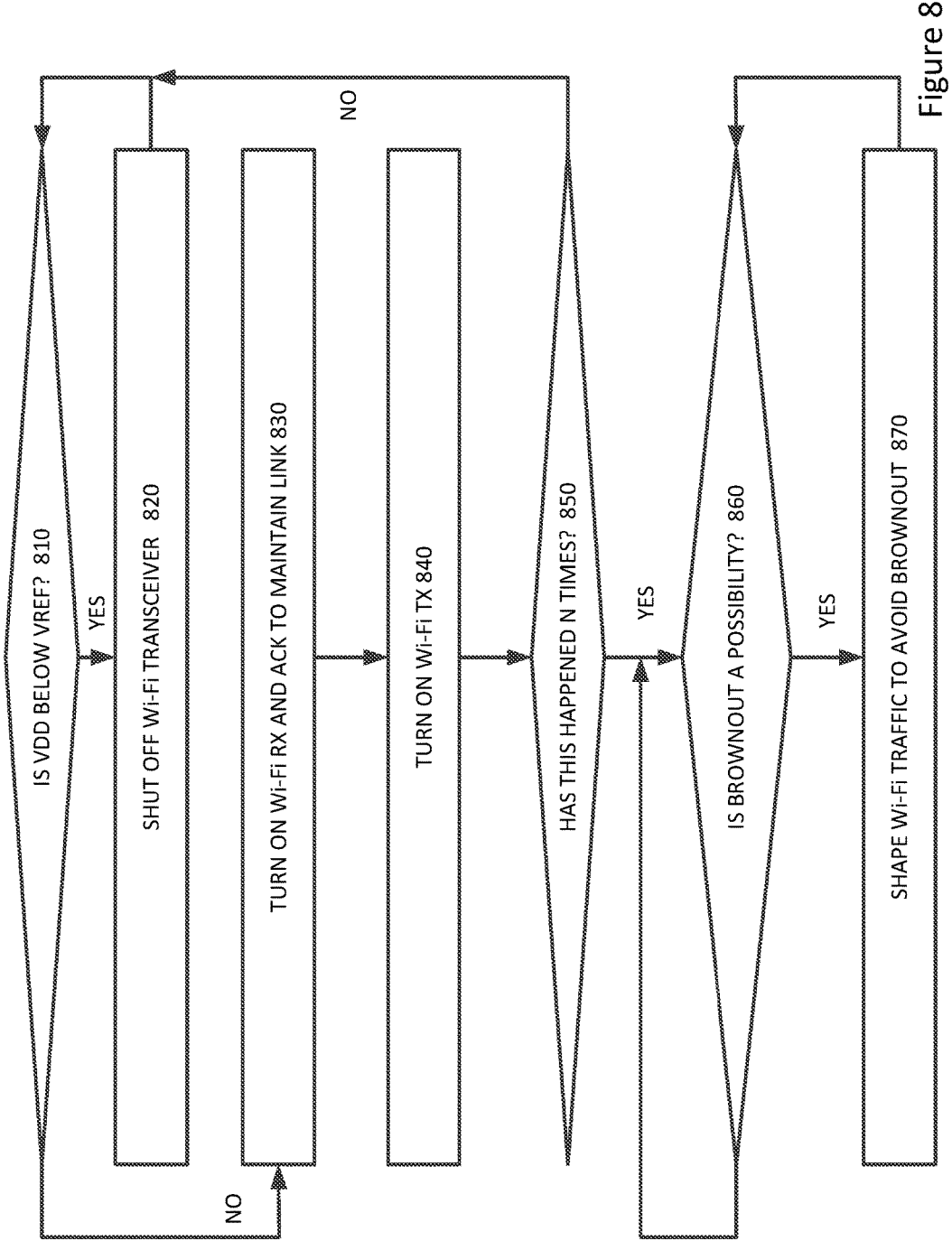
FIG. 8 illustrates a method of initially reacting to and mitigating brownout conditions, followed by a method of avoiding and preventing brownout conditions according to an embodiment of the present invention.

FIG. 8 illustrates a method of initially reacting to and mitigating brownout conditions, followed by a method of avoiding and preventing brownout conditions according to an embodiment of the present invention. In act 810, it is determined whether a net battery voltage is below a reference voltage. If it is, a Wi-Fi transceiver may be shut off in act 820. This may allow the net battery voltage to rise above the reference voltage in act 810, thereby allowing the receiver to turn on and also allowing the transmitter to turn on to send acknowledgments of received data packets in order to maintain a link in act 830. After some time, a remainder of the Wi-Fi transmit functionality may be restored in act 840. That is, in act 840, Wi-Fi data transmissions may be enabled.

In act 850, it may be determined whether the occurrence or near occurrence of a brownout condition has happened N times, where N has a value of one or more in various embodiments of the present invention. If an occurrence or near occurrence of a brownout state has not happened N times, no action is yet taken. If an occurrence or near occurrence of a brownout state has happened N times, it may be determined whether a brownout or near brownout may occur during a data transmission in act 860. If a brownout or near brownout may occur during data transmission, the Wi-Fi traffic may be shaped to avoid a brownout condition in act 870.

In various embodiments of the present invention, software may track applications that may use a Wi-Fi transceiver. Software may track the applications that may need access and how much access may be needed. This information may be useful in anticipating whether a brownout condition may occur. An example is shown in the following figure.

FIG. 9 illustrates a software layer that may be used in anticipating and avoiding brownout conditions according to an embodiment of the present invention. Level 130 may be an application software level. This level may track which applications may need access to a Wi-Fi transmitter and how much access is needed. Examples of the operation of this software layer 130 are shown in the following figure.

Figure 10:
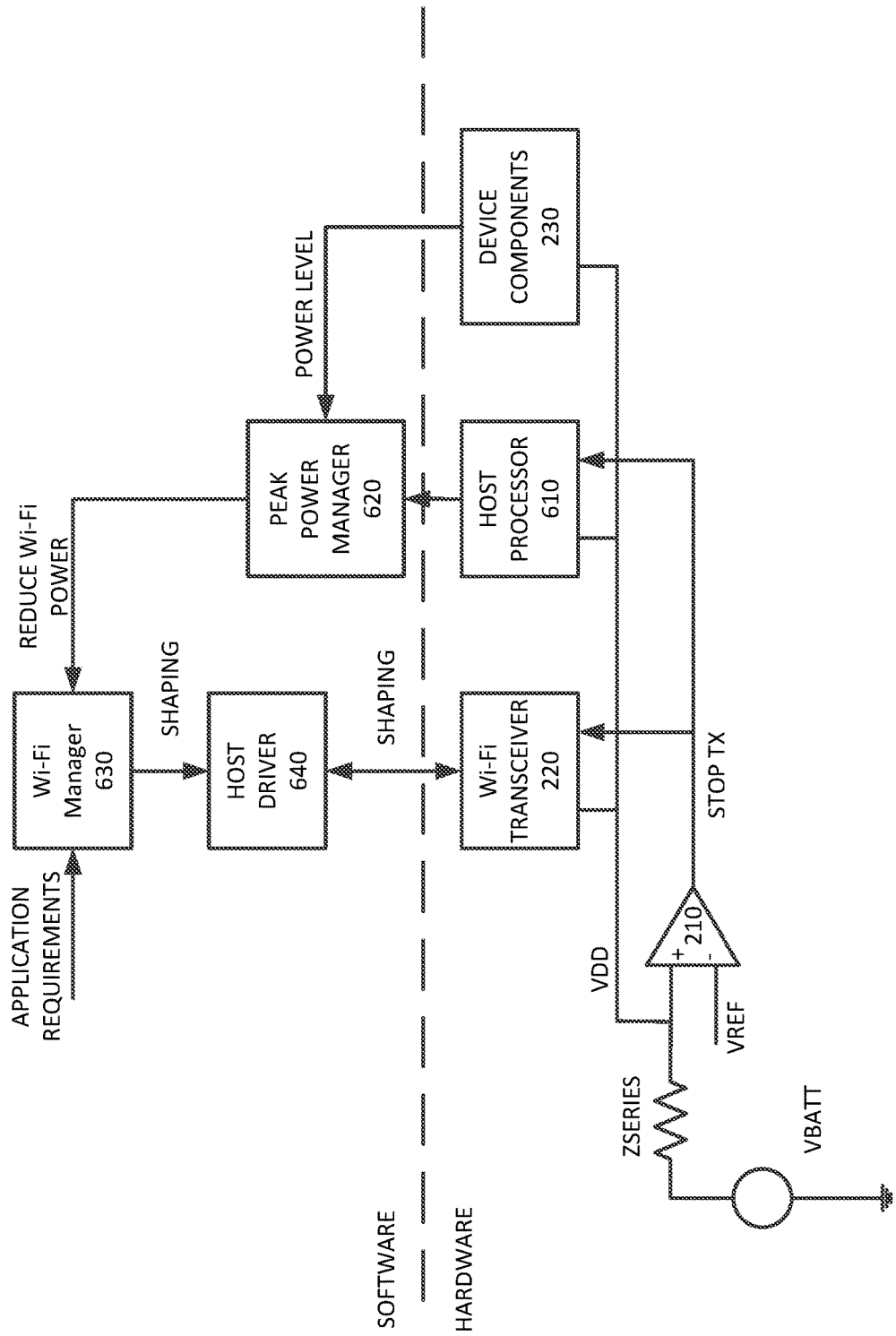
FIG. 10 illustrates hardware and software of an electronic device according to an embodiment of the present invention.

FIG. 10 illustrates hardware and software of an electronic device according to an embodiment of the present invention. This figure may be similar to the circuitry and software FIG. 6. In this example, Wi-Fi manager 630 may receive application requirements indicating which applications running on the device may need to transmit data and how much data they may need to transmit. This information may come from the applications themselves, from a hardware or software Wi-Fi manager, or from another source. This information may then be used in anticipating and avoiding brownout conditions. An example is shown in the following figure.

Figure 11:
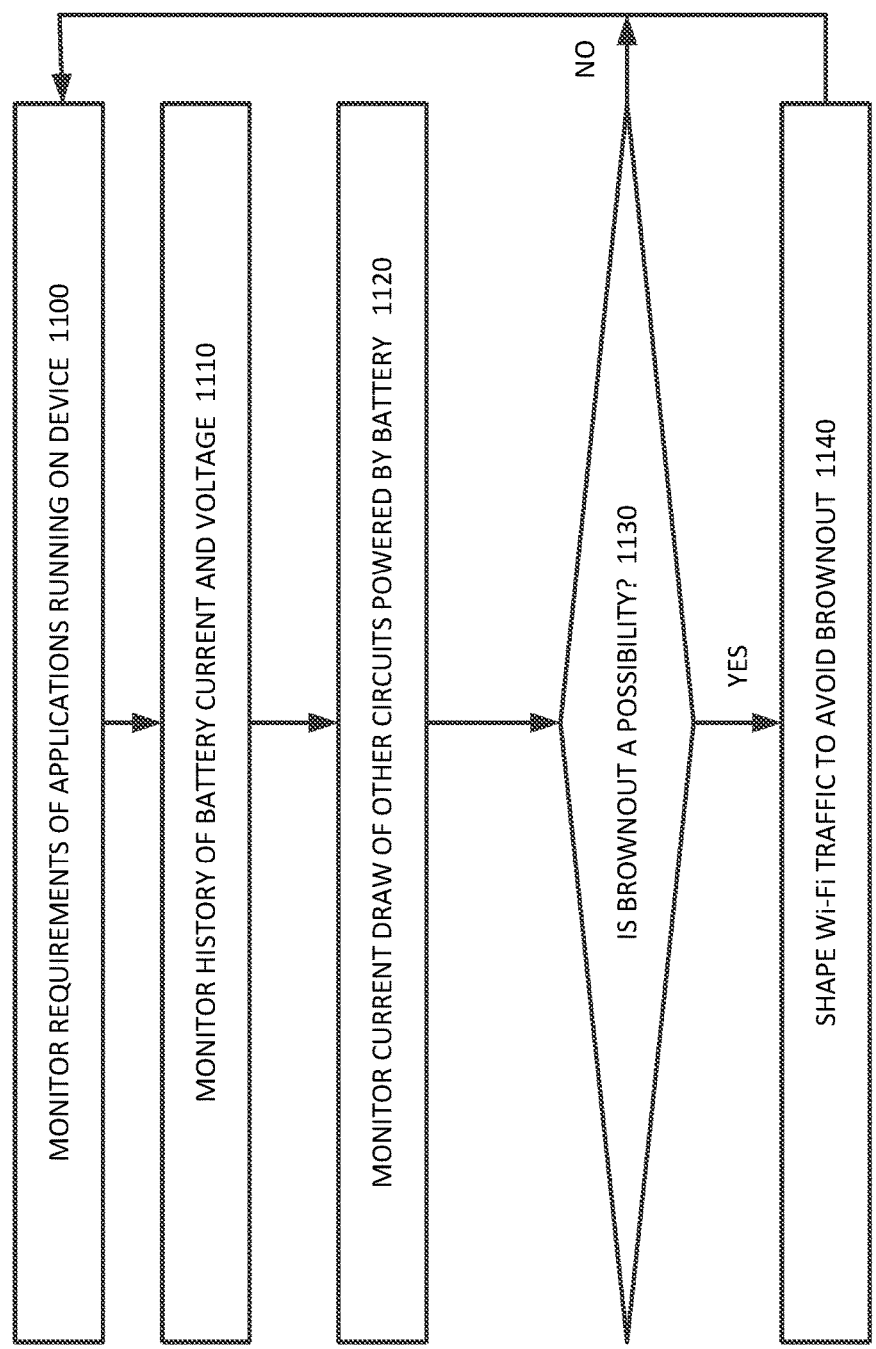
FIG. 11 illustrates a flowchart of a method of anticipating and avoiding brownout conditions according to an embodiment of the present invention.

FIG. 11 illustrates a flowchart of a method of anticipating and avoiding brownout conditions according to an embodiment of the present invention. In act 1110, requirements of applications running on a device may be monitored. Specifically, the requirements for access to a Wi-Fi transmitter may be monitored. As before, a history of battery current draw and resulting voltages may be monitored and tracked in act 1110 by a Wi-Fi manager or other circuit or software. A present level of current drawn by circuitry powered by the battery may be monitored in act 1120. This information may be used in determining whether a brownout may occur during a data transmission in act 1130. If so, the Wi-Fi transmit traffic may be shaped to avoid a brownout in act 1140.

For example, in act 1100 the requirements for access to a Wi-Fi transmitter may be monitored. Again, this information may come from the applications themselves, from a hardware or software Wi-Fi manager, or from another source. In act 1110 it may be known from the stored battery history data that the battery may reach a brownout voltage if the battery provides a first current for a first duration. It may then be determined in act 1120 that a second current is presently being drawn from the battery. From this, it may then be calculated that the transmitter may not draw an amount of current equal to the first current less the second current for the first duration without causing a brownout. The determination of whether this brownout may occur may be determined in act 1130. If a brownout may occur, then in act 1140, transmit traffic may be shaped to avoid the brownout.

In the above examples, circuitry and software on a device or devices powered by a battery may react to, anticipate, mitigate, or avoid brownout conditions. In other embodiments of the present invention, multiple devices may act in concert to react to, anticipate, mitigate, or avoid brownout conditions. Examples are shown in the following figures.

FIG. 12 illustrates a peer-to-peer software level that may be used in anticipating and preventing brownout conditions according to an embodiment of the present invention. In this example, peer-to-peer software may reduce power at a transmitter based on a received strength indication at a remote device. Also, a device may instruct a transmitting device to slow its transmission rates. This may be particularly useful where a transmitter may need to repeatedly turn on to send acknowledgments in response to received data packets. Examples are shown in the following figures.

Figure 13:
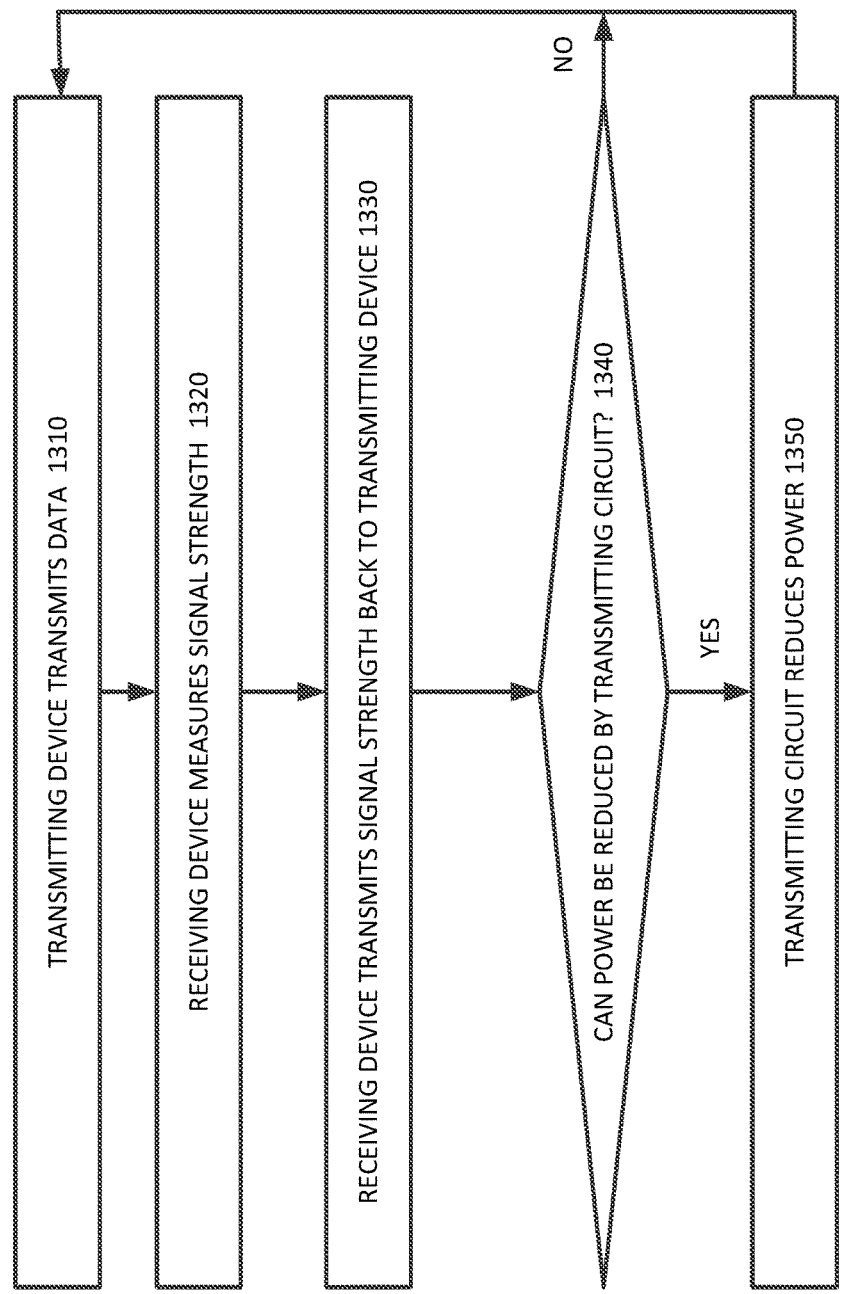
FIG. 13 illustrates a flowchart of a method of anticipating and preventing brownout conditions according to an embodiment of the present invention.

FIG. 13 illustrates a flowchart of a method of anticipating and preventing brownout conditions according to an embodiment of the present invention. In act 1310, a transmitting device may transmit data. In act 1320, a remote or receiving device may measure the signal strength of the received data. The receiving device may send the signal strength information back to the transmitting device in act 1330. In act 1340, the transmitting device may determine whether it may reduce power at the transmitter. If so, the transmitter may reduce power in act 1350.

Figure 14:
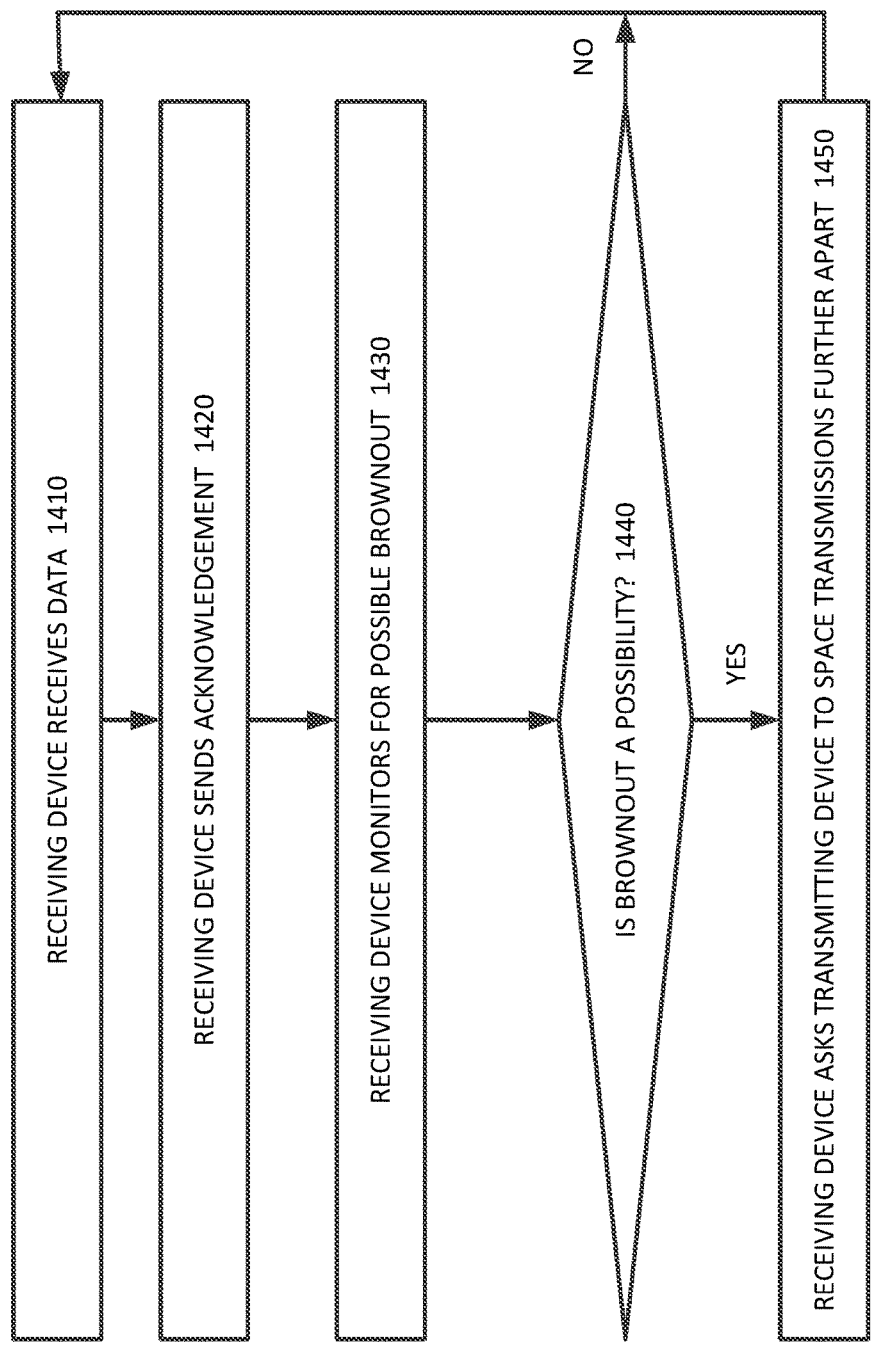
FIG. 14 illustrates another flowchart of a method of anticipating and preventing brownout conditions according to an embodiment of the present invention.

FIG. 14 illustrates another flowchart of a method of anticipating and preventing brownout conditions according to an embodiment of the present invention. In act 1410, a receiving device may receive data. In act 1420, the receiving device may send an acknowledgment. In act 1430, a receiving device may monitor whether a brownout is possible. If it is determined in act 1440 that a brownout is possible, the receiving device may ask the transmitting device to space transmissions further apart in act 1450. By spacing these transmissions further apart, corresponding acknowledgment signals may be spaced further apart as well, thereby reducing the possibility of a brownout. In this and other embodiments of the present invention, the receiving device may ask the transmitting device to shape traffic in other ways. For example, the receiving device may ask the transmitting device to aggregate packets in order to reduce a number of acknowledgments that may need to be sent.

In other embodiments of the present invention, software may monitor devices in a network and may instruct various devices in the network as to how to communicate to avoid a brownout in one or more of the devices. An example is shown in the following figure.

FIG. 15 illustrates a network management software layer that may be used in anticipating and preventing brownout conditions according to an embodiment of the present invention. In this example, network management software may instruct various devices in the network how to communicate with a first device, and it may instruct the first device how to communicate with the other devices in the network such that the first device does not encounter a brownout condition. These instructions may include instructions on how much power to use and how to shape traffic to be transmitted. In other embodiments of the present invention, the network manager may provide instructions in order to prevent more than one device from entering a brownout condition. Again, these instructions may include instructions regarding how much power to use and how to shape traffic to be transmitted.

Various embodiments of the present invention may implement traffic shaping and the other techniques disclosed in various ways using various algorithms. For example, an embodiment of the present invention may implement various levels of traffic shaping. As possible brownout conditions are detected, more stringent levels of traffic shaping may be implemented. These levels may include limiting a duty cycle of a Wi-Fi transmitter to allow time for battery recovery. They may also include increasing a minimum data rate, fragmenting long data packets, and limiting packet aggregation to limit a duration that a Wi-Fi transmitter may draw current. The power level provided to the Wi-Fi transmitter may also be reduced or limited. In these and other embodiments of the present invention, less stringent levels of traffic shaping, or no traffic shaping, may be used following certain events, such as when a new data transfer is started, after a certain amount of time, after a certain amount of time passes without the detection of a possible brownout condition, or after the device enters or exits a low-power or sleep state. An example illustrating levels of shaping that may be used is shown in the following figure.

Figure 16:
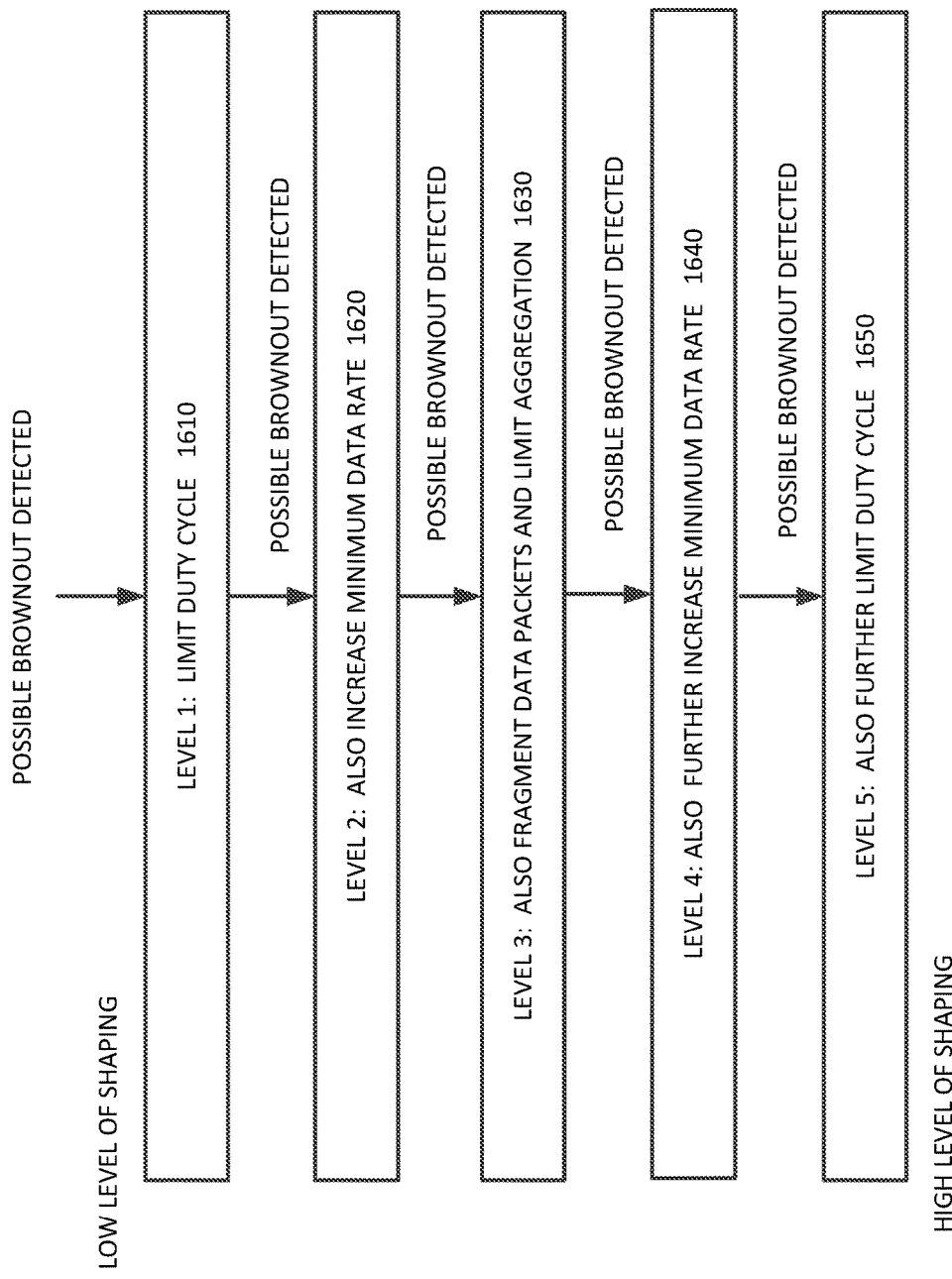
FIG. 16 illustrates a number of levels of traffic shaping that may be employed by an embodiment of the present invention.

FIG. 16 illustrates a number of levels of traffic shaping that may be employed by an embodiment of the present invention. In this figure, as data is transmitted and possible brownout conditions are detected, higher or more stringent levels of traffic shaping may be entered. In various embodiments of the present invention, a Wi-Fi traffic manager, such as Wi-Fi traffic manager 630, may limit or shape the transmit traffic provided by a transmitter, such as the Wi-Fi transmitter in Wi-Fi transceiver 220. For example, a first level of traffic shaping where a Wi-Fi transmitter's duty cycle is limited may be entered in act 1610. In various embodiments of the present invention, the transmitter duty cycle may be limited to various percentages, such as 25, 40, 50, 60, 75 or other percentage, where the percentage indicates the percentage of time that the transmitter may transmit. Limiting the duty cycle in this way may provide time for a battery to recover between transmissions to avoid further possible brownout conditions.

When limiting a duty cycle is not sufficient to avoid further possible brownout conditions, an additional cumulative step of increasing a minimum data rate may be taken in act 1620. For example, a minimum data rate, which may otherwise be 1 Mb per second, may be increased to 2 Mb per second, 5.5 Mb per second, or other data rate. This may reduce the amount of time that a Wi-Fi transmitter may transmit data, thereby helping to reduce the possibility of entering a brownout condition.

When these acts are not sufficient to avoid further possible brownout conditions, long data packets may be fragmented and limits on the aggregation of shorter data packets may be employed in act 1630. These additional cumulative steps may be done to limit a length of a Wi-Fi transmission to a specific duration or range of possible durations. In various embodiments of the present invention, the accumulation of traffic shaping in acts 1620 and 1630 may be such that Wi-Fi transmissions have a maximum packet length of 1.0, 1.5, 2.0, 2.5, 3.0, 3.5, 4.0, 4.5, or 5 ms, or other duration.

When these acts are not sufficient to avoid possible brownout conditions, further cumulative acts may be taken. For example, in act 1640, a minimum data rate may be further increased, for example to 5.5 Mb per second, 11 Mb per second, or other data rate. Also, in act 1650, the duty cycle may be further limited to a smaller value, such as 10, 15, 20, or 25 or other percent. In still other embodiments of the present invention, an output power of a Wi-Fi transmitter, such as the Wi-Fi transmitter in Wi-Fi transceiver 220, may be reduced by a peak power manager, such as peak power manager 620.

In other embodiments of the present invention, a known or presumed safe level of traffic shaping may be employed when a possible brownout condition is initially detected. This safe level may be such that the detection of further possible brownout conditions is not expected. Accordingly, when a possible brownout condition is detected, a midrange level of traffic shaping may be entered. If further possible brownouts are detected, higher or more stringent levels of traffic shaping may be employed. An example is shown in the following figure.

Figure 17:
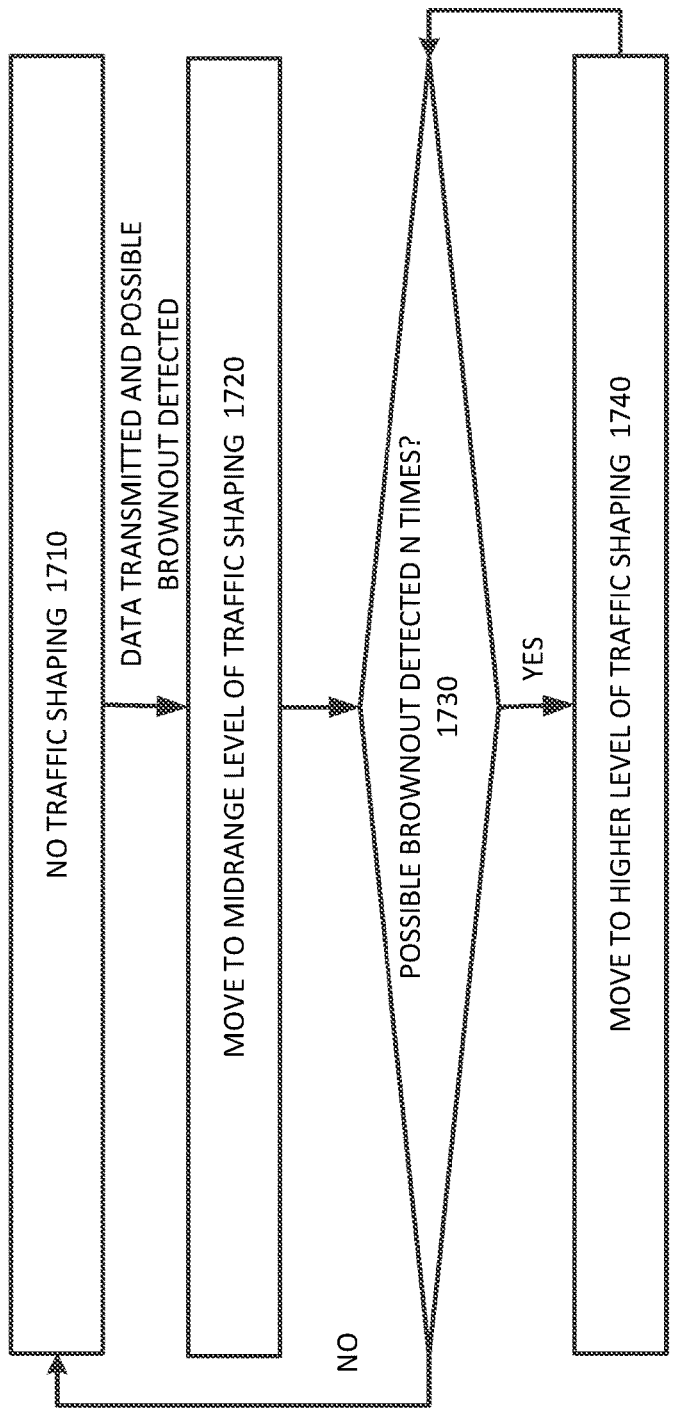
FIG. 17 is a flowchart of a method of modifying traffic shaping employed by a Wi-Fi transmitter according to an embodiment of the present invention.

FIG. 17 is a flowchart of a method of modifying traffic shaping employed by a Wi-Fi transmitter according to an embodiment of the present invention. In various embodiments of the present invention, a level of traffic shaping that is either known or presumed to be sufficient to avoid possible brownout conditions (a safe level) may be determined. This determination may be made during the design or manufacturing process, it may be made while a device is being used, or it may be initially made during design or manufacturing and later modified during use. When an initial possible brownout condition is detected, this level of shaping may be entered. If further possible brownout are detected one or more times, a higher or more stringent level of traffic shaping may be invoked.

For example, in act 1710, no traffic shaping is initially used. A possible brownout may be detected during a data transmission. In this case, a midrange level of traffic shaping may be employed in act 1720. In act 1730, it may be determined whether a possible brownout condition is detected one or more times. If it is, a higher level of shaping may be employed in act 1740. If further brownouts are not detected, then traffic shaping may be stopped or discontinued in act 1710.

In a specific embodiment of the present invention, when a possible brownout is detected, the midrange level of traffic shaping in act 1720 may correspond to Level 3 as shown in FIG. 16. That is, the transmitter duty cycle may be limited, a minimum data rate may be raised, long data packets may be fragmented, and limits on the aggregation of shorter packets may be invoked, as discussed above. If further brownouts are detected, a higher level of shaping may be invoked in act 1740, which may include further raising the minimum data rate and further limiting the duty cycle as shown in acts 1640 and 1650.

In various embodiments of the present invention, a Wi-Fi manager, such as Wi-Fi manager 630, may change the level of traffic shaping in various ways. For example, as a possible brownout condition is detected, a next higher or more stringent level of traffic shaping may be employed. When data is transmitted without a possible brownout condition being detected, a lower or less stringent level of traffic shaping may be used. In another embodiment of the present invention, when no traffic shaping is employed and a possible brownout is detected, the Wi-Fi manager may employ a midrange level of traffic shaping, as shown in FIG. 17. In another embodiment of the present invention, when no traffic shaping is employed and a possible brownout is detected, the Wi-Fi manager may skip the intermediate levels and employ a highest level of traffic shaping. When data is transmitted without a possible brownout condition being detected, a lower or less stringent level of traffic shaping may be used. Again, as each possible brownout condition is detected, a next higher or more stringent level of traffic shaping may be entered. Examples are shown in the following figures.

Figure 18:
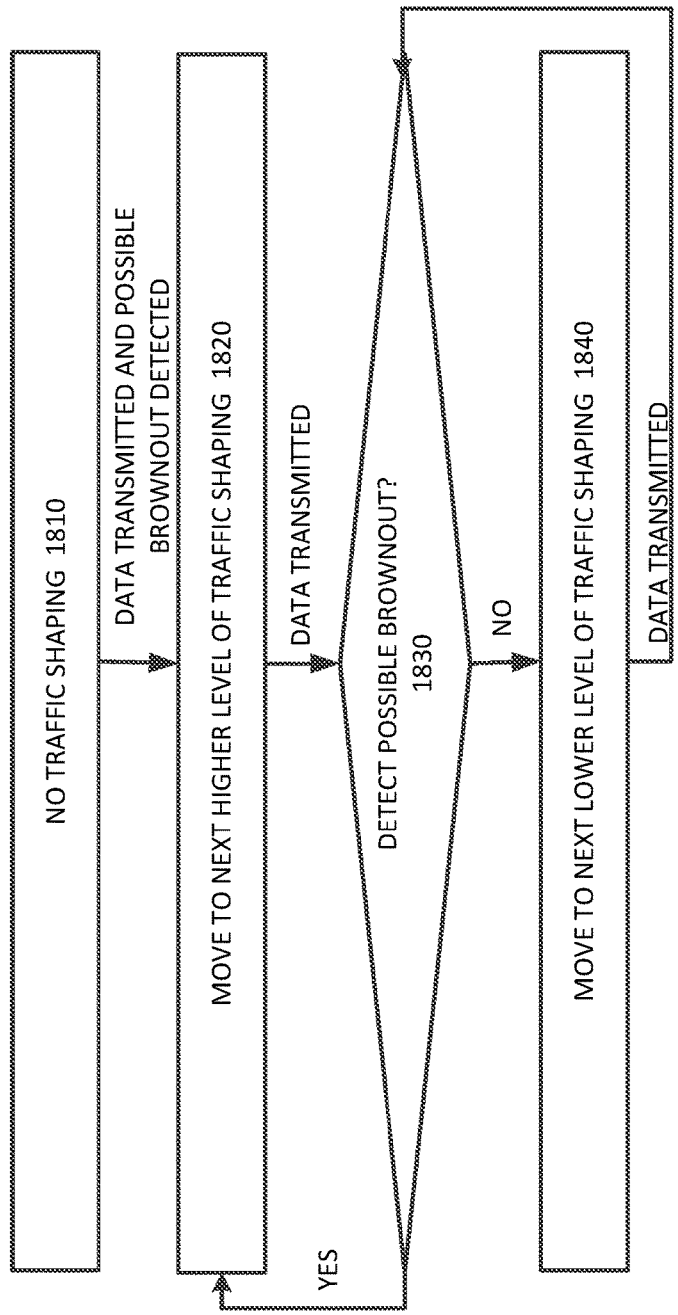
FIG. 18 illustrates a method of changing a level of traffic shaping for a Wi-Fi transmitter according to an embodiment of the present invention.

FIG. 18 illustrates a method of changing a level of traffic shaping for a Wi-Fi transmitter according to an embodiment of the present invention. In general, as brownouts are detected, higher or more stringent levels of traffic shaping may be employed. Conversely, as data is transmitted without possible brownout being detected, lower or less stringent levels of traffic shaping may be used.

For example, in act 1810, no traffic shaping is initially employed. If data is transmitted and a possible brownout is detected, a next higher or more stringent level of traffic shaping may be used in act 1820. Following that, as data is transmitted, it may be determined whether a possible brownout is detected. If it is, a next higher level of traffic shaping may be used in act 1820, and if it is not, a next lower level of traffic shaping may be used in act 1840.

In this example, when no traffic shaping is used but a possible brownout condition is detected, a Wi-Fi manager, such as Wi-Fi manager 630, may move to a first level of traffic shaping, though again, in other embodiments of the present invention, the Wi-Fi manager may move to a midrange level of traffic shaping, as shown in FIG. 17. In other embodiments of the present invention, when no traffic shaping is used and a possible brownout is detected, the Wi-Fi manager may move to the highest or most stringent level of traffic shaping. An example is shown in the following figure.

Figure 19:
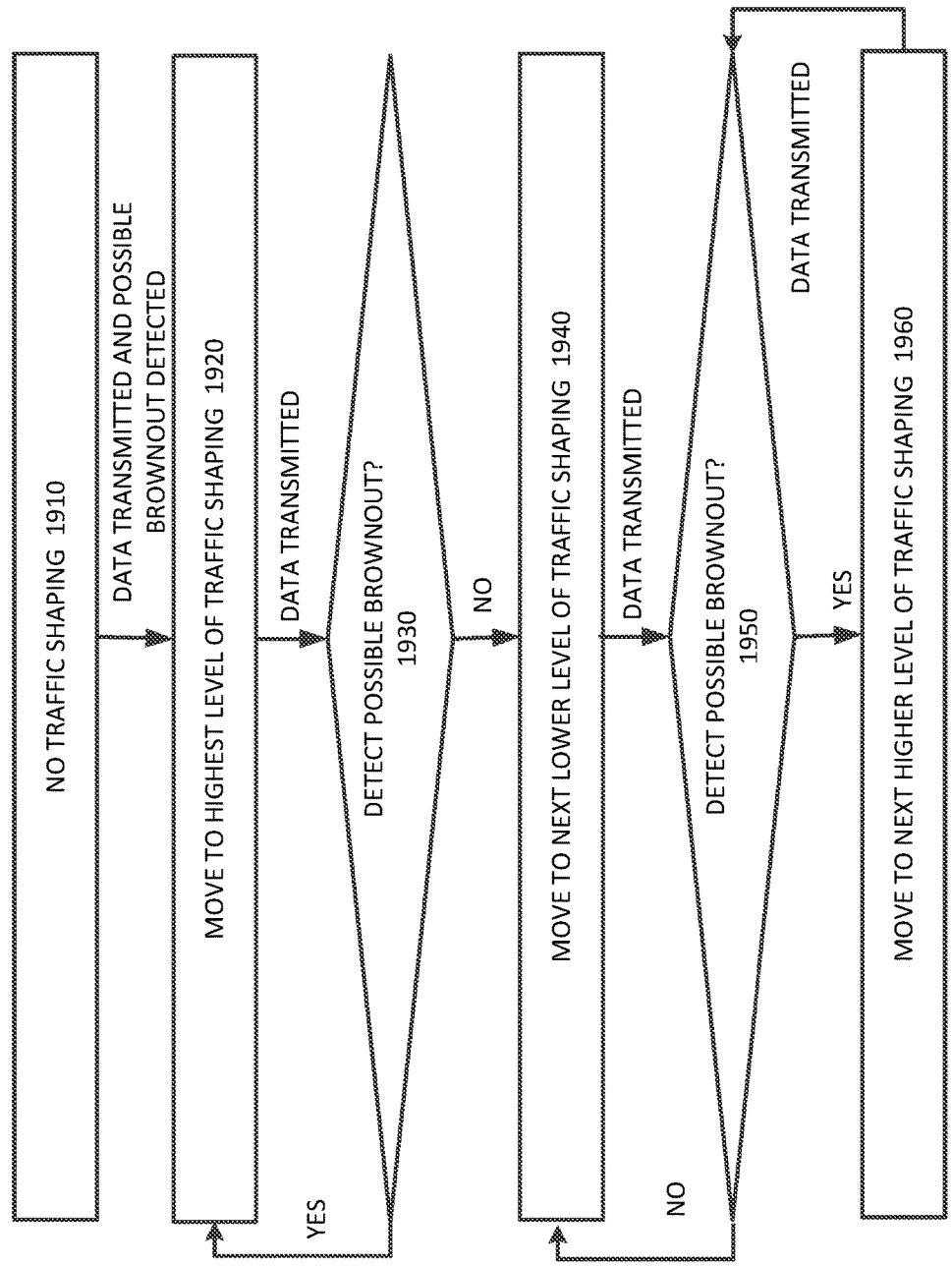
FIG. 19 illustrates a method of changing a level of traffic shaping for a Wi-Fi transmitter according to an embodiment of the present invention.

FIG. 19 illustrates a method of changing a level of traffic shaping for a Wi-Fi transmitter according to an embodiment of the present invention. In act 1910, no traffic shaping is initially employed. When data is transmitted and a possible brownout is detected, a Wi-Fi manager, such as Wi-Fi manager 630, may move or change traffic shaping to the highest level in act 1920. Following that, as data is transmitted and possible brownouts are detected, the Wi-Fi manager may maintain the highest level of traffic shaping in act 1920. As data is transmitted and further possible brownouts are not detected, lower or less stringent levels of traffic shaping may be employed in act 1940. As further data is transmitted and possible brownouts are detected, higher levels of traffic shaping may be used in act 1960, and if they are not detected, lower or less stringent levels may be entered in act 1940.

In various embodiments of the present invention, traffic shaping may be reduced or stopped at the occurrence of one or more of several events. For example, when the transmission of a group of packets or message is completed, or the system enters or exits a sleep state, traffic shaping may be reduced or exited. In these or other embodiments of the present invention, when a specific duration has passed, or when a specific duration has passed without the detection of a possible brownout state, traffic shaping may be stopped or reduced. For example, if no brownout is detected for a first duration, the level of traffic shaping may be reduced. In these embodiments an application layer may determine that one or more applications may use high power levels for a period of time such that possible brownout conditions may continue. The Wi-Fi manager may receive this information from the application layer and may prevent the level of traffic shaping from being decreased. An example is show in the following figure.

Figure 20:
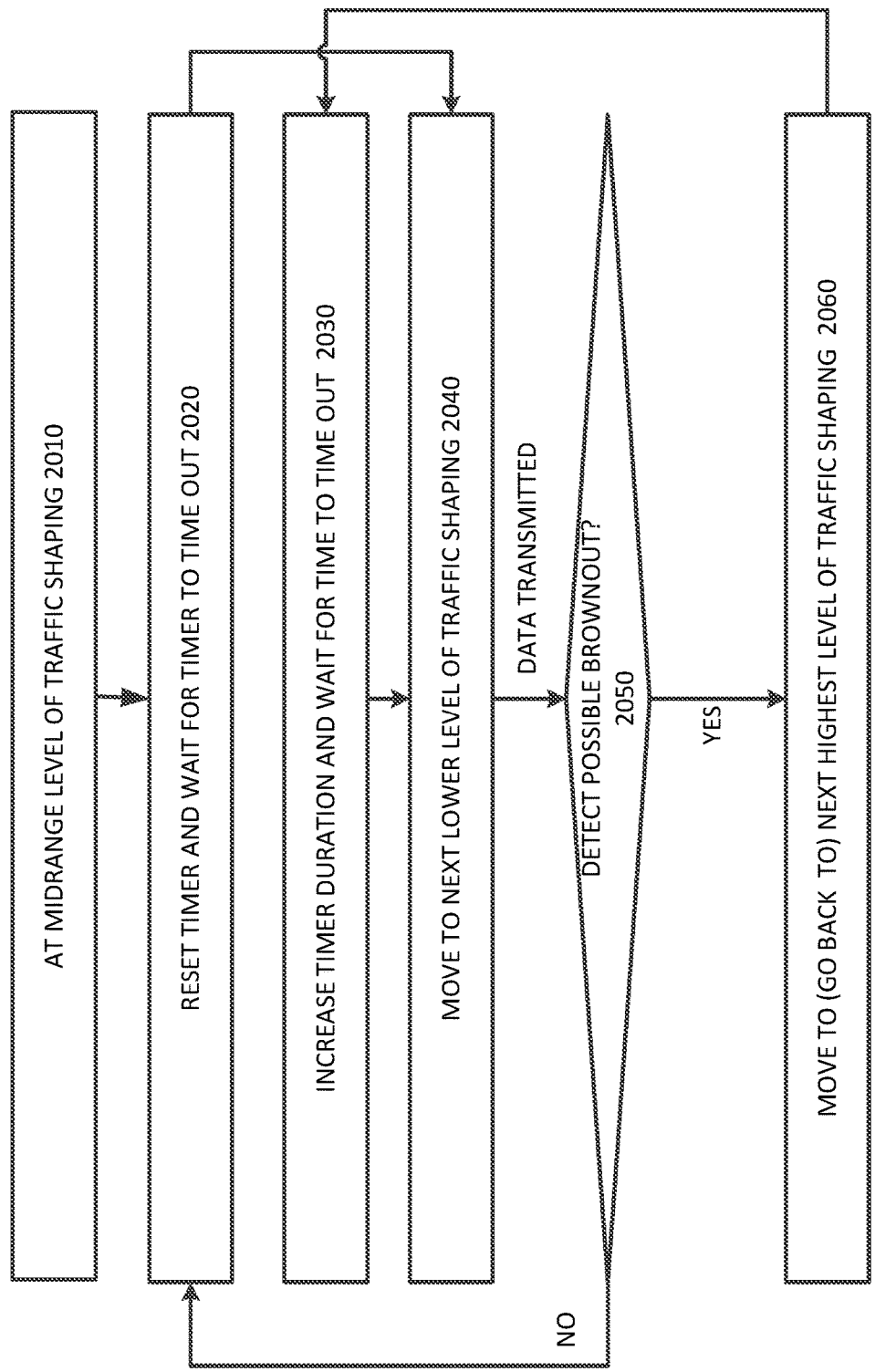
FIG. 20 illustrates a method of changing a level of traffic shaping for a Wi-Fi transmitter according to an embodiment of the present invention.

FIG. 20 illustrates a method of changing a level of traffic shaping for a Wi-Fi transmitter according to an embodiment of the present invention. Again, in various embodiments of the present invention, once a possible brownout condition is detected, a midrange level of traffic shaping may be entered in an attempt to try to avoid further possible brownout conditions. Once in that state, there are various ways that the traffic shaping state may be exited. Again, in various embodiments of the present invention, a transmitter may exit a traffic shaping state after a certain period of time. In other embodiments, once this certain period of time is over and possible brownout conditions have not been detected, a Wi-Fi manager, such as Wi-Fi manager 630, may move the Wi-Fi transmitter to a lower or less stringent level of traffic shaping.

For example, in act 2010, a transmitter may be at a mid-range a level of traffic shaping. In act 2020, a timer may be reset and the transmitter may wait for the timer to time out. Following that, a next lower or less stringent level of traffic shaping may be employed. When data is transmitted, if a possible brownout is not detected, the transmitter may stay at that lower level of traffic shaping and return to act 2020. This same procedure may be used to progressively reduce a level of traffic shaping. When a possible brownout is detected in act 2050, the transmitter may return or go back to the next highest level of traffic shaping in act 2060. The timer duration may be increased in act 2030 and the transmitter may wait for this extended timer to time out before trying the lower level of traffic shaping again in act 2040.

In various embodiments of the present invention, a Wi-Fi manager, such as Wi-Fi manager 630, may receive information from an application layer that may indicate that one or more applications may be using a large amount of power for an extended duration. In this case, the Wi-Fi manager may determine that a current level of traffic shaping may need to be maintained. In such case, this timer routine may be disabled and the Wi-Fi manager may maintain the current level of traffic shaping.

In these embodiments of the present invention, various parameters, such as transmitter duty cycle, data rate, fragmentation and aggregation, and transmit power level, may be varied. In various embodiments the present invention, one or more of these parameters may be varied while resulting bit error rates for data transmissions are measured. The resulting bit error rates may be used to optimize or improve traffic shaping such that brownout conditions may be avoided without unduly increasing the bit error rates for data transmissions.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. An electronic device comprising:
    a load circuit coupled to be powered by a battery;
    a monitor circuit coupled to the battery to monitor a net battery voltage provided by the battery and to provide a first signal, the first signal having a first polarity when the net battery voltage is lower than a first threshold voltage and the first signal having a second polarity when the net battery voltage is higher than the first threshold voltage;
    a communication transceiver coupled to the monitor circuit to receive the first signal, wherein the communication transceiver shuts off when the first signal has the first polarity and turns on when the first signal has the second polarity, wherein the first threshold voltage is set higher than a minimum voltage needed for operation by the communication transceiver, and wherein when the communication transceiver transmits packets, the communication transceiver draws a first current from the battery;
    a peak power manager to determine a second current drawn from the battery by the load circuit and to provide a shaping request signal when it determines that the second current is such that the net battery voltage will be lower than the first threshold voltage if the communication transceiver turns on to transmit packets and draws the first current from the battery for more than a first duration; and
    a Wi-Fi manager to, responsive to receiving the shaping request signal from the peak power manager, shape packet traffic transmitted by the communication transceiver such that the communication transceiver turns on to transmit the shaped packet traffic and draws the first current from the battery for less than the first duration.

2. The electronic device of claim 1 wherein when the communication transceiver is shut off and the first signal has the second polarity, a receive circuit in the communication transceiver is turned on to receive packets and a transmit circuit in the communication transceiver is turned on to transmit acknowledgements of the received packets.

3. The electronic device of claim 2 wherein after the receive circuit in the communication transceiver is turned on and the first signal has the second polarity for a first duration, the transmit circuit in the communication transceiver is turned on to transmit packets.

4. The electronic device of claim 3 wherein the communication transceiver comprises a Wi-Fi transceiver.

5. An electronic device comprising:
    electronic circuitry coupled to be powered by a battery;
    a monitor circuit coupled to compare a net battery voltage provided by the battery to a first threshold voltage and to provide an indication of a brownout condition when the net battery voltage is less than the first threshold voltage;
    a transceiver circuit having a transmitter to transmit data, wherein when the transceiver circuit transmits data, the transceiver circuit draws a first current from the battery;
    a peak power manager to determine a second current drawn from the battery by the electronic circuitry and to provide a shaping request signal when it determines that the second current is such that the monitor circuit will indicate a brownout condition if the transceiver circuit turns on to transmit data and draws the first current from the battery for more than a first duration; and
    a Wi-Fi manager to, responsive to receiving the shaping request signal from the peak power manager, shape data traffic transmitted by the transceiver circuit such that the transceiver circuit turns on to transmit the shaped data traffic and draws the first current from the battery for less than the first duration.

6. The electronic device of claim 5 wherein shaping the data traffic comprises limiting a duty cycle of a transmitter in the transceiver circuit.

7. The electronic device of claim 5 wherein shaping the data traffic comprises limiting a number of packets to be aggregated before being transmitted by the transceiver circuit.

8. The electronic device of claim 5 wherein shaping the data traffic comprises fragmenting at least one packet to be transmitted by the transceiver circuit.

9. The electronic device of claim 5 wherein shaping the data traffic comprises increasing a data rate of at least one packet to be transmitted by the transceiver circuit.

10. The electronic device of claim 5 wherein shaping the data traffic causes a reduction in throughput of data transmitted by the transceiver circuit.

11. The electronic device of claim 5 wherein the Wi-Fi manager further monitors expected usage of one or more applications running on the electronic device.

12. The electronic device of claim 11 wherein the Wi-Fi manager uses the expected usage of one or more applications in determining the shaping of the data traffic.

13. The electronic device of claim 5 wherein the transceiver circuit comprises a Wi-Fi transceiver circuit.

14. A non-transitory computer-readable medium that stores instructions executable by an electronic device to cause the electronic device to perform a method of transmitting data, the method comprising:
 determining whether a data transmission will cause a brownout condition, and if the data transmission will cause a brownout condition, then shaping the data transmission such that the brownout condition is avoided, otherwise
 not shaping the data transmission,
 wherein determining whether a data transmission will cause a brownout condition includes monitoring and storing a history for a battery in the electronic device.

15. The computer-readable medium of claim 14 wherein the method further comprises when the data transmission is shaped, a throughput of the transmitted data is reduced.

16. The computer-readable medium of claim 14 wherein determining whether the data transmission will cause a brownout condition includes determining a current being drawn from the battery in the electronic device.

17. The computer-readable medium of claim 14 wherein shaping the data transmission comprises limiting a duty cycle of data to be transmitted.

18. The computer-readable medium of claim 14 wherein shaping the data transmission comprises limiting a number of packets that will be aggregated before being transmitted.

19. The computer-readable medium of claim 14 wherein shaping the data transmission comprises fragmenting at least one packet to be transmitted.

20. The computer-readable medium of claim 14 wherein shaping the data transmission comprises increasing a data rate of at least one packet to be transmitted.

21. The electronic device of claim 1 wherein the monitor circuit comprises a comparator.

22. The electronic device of claim 1 wherein the communication transceiver turns on following a delay after the first signal changes from the first polarity to the second polarity.

23. The electronic device of claim 1 wherein the monitor circuit comprises a hysteresis comparator.

* * * * *